United States Patent
Gou et al.

(10) Patent No.: US 11,830,167 B2
(45) Date of Patent: Nov. 28, 2023

(54) SYSTEM AND METHOD FOR SUPER-RESOLUTION IMAGE PROCESSING IN REMOTE SENSING

(71) Applicant: PING AN TECHNOLOGY (SHENZHEN) CO., LTD., Shenzhen (CN)

(72) Inventors: Yuchuan Gou, Sunnyvale, CA (US); Juihsin Lai, Santa Clara, CA (US); Mei Han, Palo Alto, CA (US)

( * ) Notice: Subject to any disclaimer, the term of this patent is extended or adjusted under 35 U.S.C. 154(b) by 310 days.

(21) Appl. No.: 17/353,792

(22) Filed: Jun. 21, 2021

(65) Prior Publication Data
US 2022/0405883 A1 Dec. 22, 2022

(51) Int. Cl.
*G06V 10/50* (2022.01)
*G06T 3/40* (2006.01)
*G06V 20/10* (2022.01)
*G06F 18/214* (2023.01)
*G06F 18/25* (2023.01)

(52) U.S. Cl.
CPC .......... *G06T 3/4076* (2013.01); *G06F 18/214* (2023.01); *G06F 18/253* (2023.01); *G06T 3/4046* (2013.01); *G06V 10/50* (2022.01); *G06V 20/188* (2022.01)

(58) Field of Classification Search
CPC ......... G06T 2207/10032; G06T 3/4053; G06T 3/4076; G06T 2207/20016; G06T 5/40; G06T 3/4046; G06T 2207/20081; G06T 2207/20084; G06T 2207/30181; G06V 20/13; G06V 20/17; G06V 10/50; G06V 30/18086; G06V 10/507; G06V 30/18095; G06V 10/28; G06V 10/758; G06V 10/10; G06V 10/20; G06V 30/19073; G06V 10/454; G06V 10/70; G06V 20/188; G06F 18/00; G06F 18/214; G06N 3/02; G06N 3/045; G06N 3/0455; G06N 3/0464; G06N 3/049; G06N 20/00
See application file for complete search history.

(56) References Cited

FOREIGN PATENT DOCUMENTS

CN 112949549 A * 6/2021 ........... G06K 9/0063

OTHER PUBLICATIONS

Salvetti et al. "Multi-image super resolution of remotely sensed images using residual attention deep neural networks." Remote Sensing 12.14 (2020): 2207 (Year: 2020).*

* cited by examiner

*Primary Examiner* — Sumati Lefkowitz
*Assistant Examiner* — Michael Adam Shariff
(74) *Attorney, Agent, or Firm* — BAYES PLLC

(57) ABSTRACT

A system and a method for super-resolution image processing in remote sensing are disclosed. One or more sets of multi-temporal images with an input resolution and one or more first target images with a first output resolution are generated from one or more data sources. The first output resolution is higher than the input resolution. Each set of multi-temporal images is processed to improve an image match in the corresponding set of multi-temporal images. The one or more sets of multi-temporal images are associated with the one or more first target images to generate a training dataset. A deep learning model is trained using the training dataset. The deep learning model is provided for subsequent super-resolution image processing.

20 Claims, 14 Drawing Sheets

SYSTEM AND METHOD FOR SUPER-RESOLUTION IMAGE PROCESSING IN REMOTE SENSING

TECHNICAL FIELD

The present disclosure relates to image processing, and more particularly, to a system and method for super-resolution image processing in remote sensing.

BACKGROUND

Recently, a demand for identifying and classifying crops in agricultural applications has increased significantly in various places. For example, a growth status of crops in farmland can be monitored so that suitable care can be provided to the crops in time. Satellite remote sensing technology has advantages such as a short revisit period, a wide coverage area, and a low acquisition cost, etc., and can be used to provide a large amount of satellite remote sensing images for crop monitoring, identification and classification. However, most of the satellite remote sensing images have a low resolution, and high-resolution remote sensing images are relatively expensive.

SUMMARY

In one aspect, a method for super-resolution image processing in remote sensing is disclosed. One or more sets of multi-temporal images with an input resolution and one or more first target images with a first output resolution are generated from one or more data sources. The first output resolution is higher than the input resolution. Each set of multi-temporal images is processed to improve an image match in the corresponding set of multi-temporal images. The one or more sets of multi-temporal images are associated with the one or more first target images to generate a training dataset. A deep learning model is trained using the training dataset. The deep learning model is provided for subsequent super-resolution image processing.

In another aspect, a system for super-resolution image processing in remote sensing is disclosed. The system includes a memory and a processor. The memory is configured to store instructions. The processor is coupled to the memory and configured to execute the instructions to perform a process including: generating, from one or more data sources, one or more sets of multi-temporal images with an input resolution and one or more first target images with a first output resolution; processing each set of multi-temporal images to improve an image match in the corresponding set of multi-temporal images; associating the one or more sets of multi-temporal images with the one or more first target images to generate a training dataset; training a deep learning model using the training dataset; and providing the deep learning model for subsequent super-resolution image processing. The first output resolution is higher than the input resolution.

In yet another aspect, a non-transitory computer-readable storage medium is disclosed. The non-transitory computer-readable storage medium is configured to store instructions which, in response to an execution by a processor, cause the processor to perform a process including: generating, from one or more data sources, one or more sets of multi-temporal images with an input resolution and one or more first target images with a first output resolution; processing each set of multi-temporal images to improve an image match in the corresponding set of multi-temporal images; associating the one or more sets of multi-temporal images with the one or more first target images to generate a training dataset; training a deep learning model using the training dataset; and providing the deep learning model for subsequent super-resolution image processing. The first output resolution is higher than the input resolution.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated herein and form a part of the specification, illustrate implementations of the present disclosure and, together with the description, further serve to explain the present disclosure and to enable a person skilled in the pertinent art to make and use the present disclosure.

Figure 1:
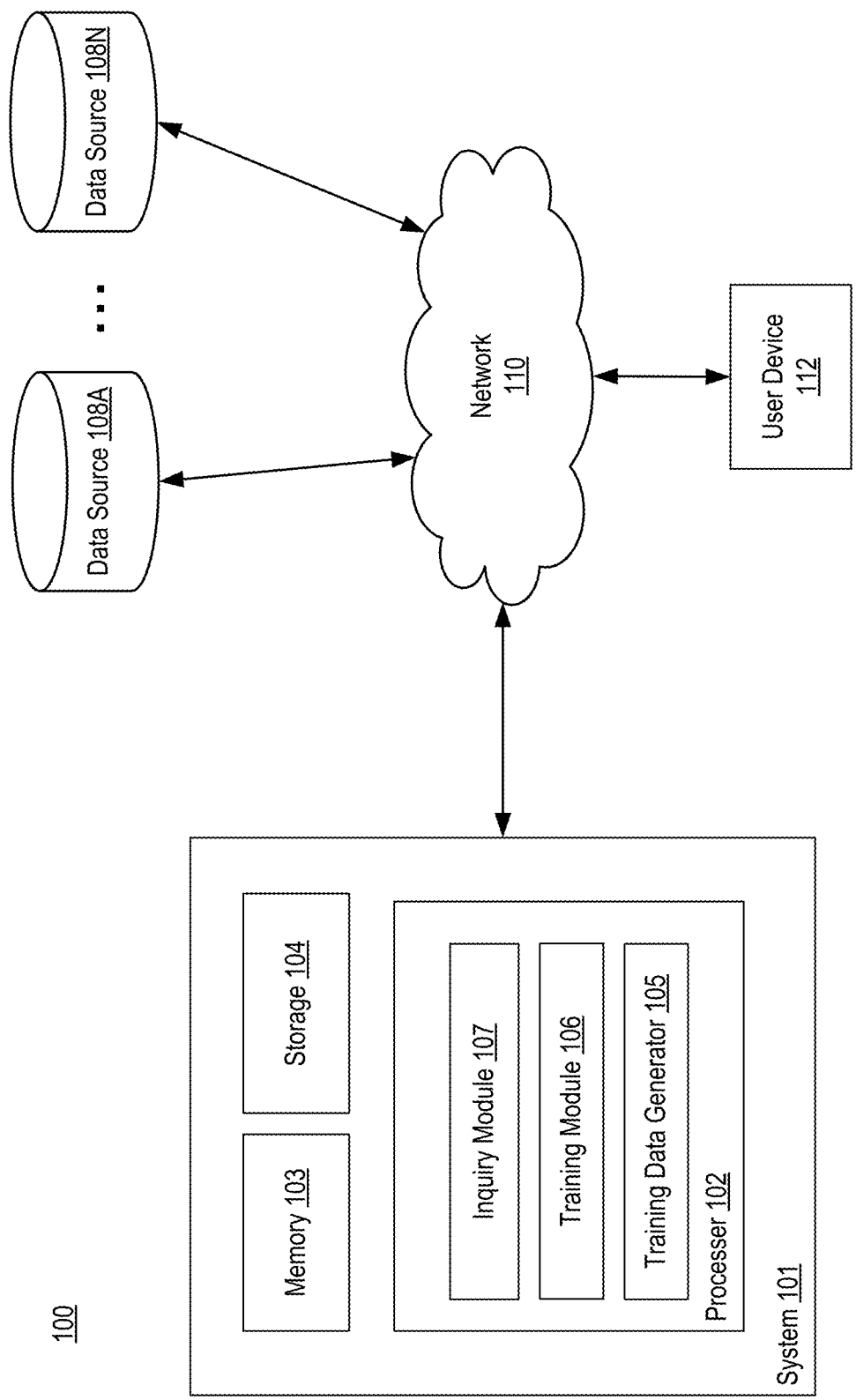
FIG. 1 illustrates a block diagram of an exemplary operating environment for a system configured to perform super-resolution image processing in remote sensing, according to embodiments of the disclosure.

Implementations of the present disclosure will be described with reference to the accompanying drawings.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Remote sensing can include a process of detecting and monitoring physical characteristics of an area by measuring its reflected and emitted radiation at a distance (e.g., from a satellite or an aircraft). Cameras can be installed in satellites or aircrafts to collect remotely sensed images (also referred to as remote sensing images). In some applications, the remote sensing images can be used to track changes in farmland over a period of time. For example, the remote sensing images can be processed for identifying and classifying crops in farmland. Machine learning techniques can be used to improve a resolution of the remote sensing images, so that a better identification and classification of the crops can be achieved based on the remote sensing images.

However, general machine learning models are usually trained with image datasets that mainly include a large number of various objects, which are slightly different from the remote sensing images captured by satellites or aircrafts. As a result, a direct application of general machine learning models in the processing of the remote sensing images may lead to a model generalization problem with poor performance.

A training of a machine learning model may need a large amount of training data in order to make the machine learning model converge. For example, a large amount of low-resolution remote sensing images and corresponding high-resolution remote sensing images are needed to train the machine learning model. Since high-resolution remote sensing images are expensive to obtain, it can be difficult to obtain this large amount of training data from available satellite remote sensing images, resulting in a training data acquisition problem. For example, low-resolution remote sensing images captured for a geographical location at different times and the corresponding high-resolution remote sensing images for the same geographical location can be difficult to obtain from a single data source.

Additionally, an acquisition of the remote sensing images by satellites or aircrafts can be easily affected by weather conditions, and the remote sensing images can be occluded by obstructions such as clouds, haze, smog, etc. As a result, an output image generated by a machine learning model may not be desirable if the machine learning model only takes a single image as an input. For example, if an input image is occluded by clouds, the machine learning model may fail to generate a desirable output image from the single input image due to an occlusion of the clouds in the input image.

In this disclosure, a system and method for super-resolution image processing in remote sensing are provided by effectively training a deep learning model with multi-temporal training data and applying the trained deep learning model to generate high-resolution remote sensing images. The multi-temporal training data and corresponding target images (e.g., corresponding high-resolution images) can be generated from multiple data sources, which can solve the training data acquisition problem described above.

Consistent with the present disclosure, the multi-temporal training data can include one or more sets of multi-temporal images, with each set of multi-temporal images captured at different times. Each set of multi-temporal images can be processed to improve an image match between the images. For example, a histogram matching can be performed to match colors in the set of multi-temporal images. In another example, the set of multi-temporal images can be aligned at a feature level so that mismatch or misalignment caused by different data sources can be reduced or removed. As a result, through the processing or optimization of the multi-temporal images, a super-resolution performance of the deep learning model can be improved.

Consistent with the present disclosure, the deep learning model uses a set of multi-temporal images as an input, which can reduce or minimize an influence of weather conditions on the super-resolution performance of the model when compared to using a single input image in the model. For example, even if one of the multi-temporal images inputted into the deep learning model is occluded by clouds, the deep learning model can also learn information of a landscape that is blocked by the clouds through the other images inputted to the model. Thus, the super-resolution performance of the deep learning model can be improved using the multi-temporal images.

Consistent with the present disclosure, a user can provide one or more parameters for requesting a high-resolution remote sensing image. The system and method described herein can apply the deep learning model to generate the high-resolution remote sensing image from a set of low-resolution remote sensing images. The deep learning model can reduce or eliminate an influence of weather conditions such as occlusion by clouds, haze, fog, etc., on the high-resolution remote sensing image. Thus, the high-resolution remote sensing image can have an improved quality, and user experience of the high-resolution remote sensing image can be enhanced. Therefore, the systems and methods described herein can be applied to generate high-resolution remote sensing images with an improved quality to assist agricultural applications.

FIG. 1 illustrates an exemplary operating environment 100 for a system 101 configured to perform super-resolution image processing in remote sensing, according to embodiments of the disclosure. Operating environment 100 may include system 101, one or more data sources 108A, . . . , 108N (also referred to as data source 108, individually or collectively), a user device 112 and any other suitable components. Components of operating environment 100 may be coupled to each other through a network 110.

In some embodiments, system 101 may be embodied on a computing device. The computing device can be, for example, a server, a desktop computer, a laptop computer, a tablet computer, or any other suitable electronic device including a processor and a memory. In some embodiments, system 101 may include a processor 102, a memory 103, and a storage 104. It is understood that system 101 may also include any other suitable components for performing functions described herein.

In some embodiments, system 101 may have different components in a single device, such as an integrated circuit (IC) chip, or separate devices with dedicated functions. For example, the IC may be implemented as an application-specific integrated circuit (ASIC) or a field-programmable gate array (FPGA). In some embodiments, one or more components of system 101 may be located in a cloud computing environment or may be alternatively in a single location or distributed locations. In some embodiments, components of system 101 may be in an integrated device or distributed at different locations but communicate with each other through network 110.

Processor 102 may include any appropriate type of general-purpose or special-purpose microprocessor, digital signal processor, microcontroller, graphics processing unit (GPU). Processor 102 may include one or more hardware units (e.g., portion(s) of an integrated circuit) designed for use with other components or to execute part of a program. The program may be stored on a computer-readable medium, and when executed by processor 102, it may perform one or more functions. Processor 102 may be configured as a separate processor module dedicated to image processing. Alternatively, processor 102 may be configured as a shared processor module for performing other functions unrelated to image processing.

Processor 102 may include several modules, such as a training data generator 105, a training module 106, and an inquiry module 107. Although FIG. 1 shows that training data generator 105, training module 106 and inquiry module 107 are within one processor 102, they may also be likely implemented on different processors located closely or remotely with each other. For example, training data generator 105 and training module 106 may be implemented by a processor (e.g., a GPU) dedicated to off-line training, and inquiry module 107 may be implemented by another processor for generating high-resolution remote sensing images responsive to user inquiries.

Training data generator 105, training module 106 and inquiry module 107 (and any corresponding sub-modules or sub-units) can be hardware units (e.g., portions of an integrated circuit) of processor 102 designed for use with other components or software units implemented by processor 102 through executing at least part of a program. The program may be stored on a computer-readable medium, such as memory 103 or storage 104, and when executed by processor 102, it may perform one or more functions.

Memory 103 and storage 104 may include any appropriate type of mass storage provided to store any type of information that processor 102 may need to operate. For example, memory 103 and storage 104 may be a volatile or non-volatile, magnetic, semiconductor-based, tape-based, optical, removable, non-removable, or other type of storage device or tangible (i.e., non-transitory) computer-readable medium including, but not limited to, a ROM, a flash memory, a dynamic RAM, and a static RAM. Memory 103 and/or storage 104 may be configured to store one or more computer programs that may be executed by processor 102 to perform functions disclosed herein. For example, memory 103 and/or storage 104 may be configured to store program(s) that may be executed by processor 102 to perform super-resolution image processing. Memory 103 and/or storage 104 may be further configured to store information and data used by processor 102.

Each data source 108 may include one or more storage devices configured to store remote sensing images. The remote sensing images can be captured by cameras installed in satellites, manned or unmanned aircrafts such as unmanned aerial vehicles (UAVs), hot balloons, etc. For example, a first data source 108 may be a National Agriculture Imagery Program (NAIP) data source and may store remote sensing images with a first source resolution (e.g., 0.6 meters). The remote sensing images from the NAIP data source can be referred to as NAIP images. A second data source 108 may be a Sentinel-2 data source and may store remote sensing images with a second source resolution (e.g., 10 meters). The remote sensing images from the Sentinel-2 data source can be referred to as Sentinel-2 images. The Sentinel-2 images and the NAIP images are free satellite remote sensing images. Although FIG. 1 illustrates that system 101 and data sources 108 are separate from each other, in some embodiments data sources 108 and system 101 can be integrated into a single device.

User device 112 can be a computing device including a processor and a memory. For example, user device 112 can be a desktop computer, a laptop computer, a tablet computer, a smartphone, a game controller, a television (TV) set, a music player, a wearable electronic device such as a smart watch, an Internet-of-Things (IoT) appliance, a smart vehicle, or any other suitable electronic device with a processor and a memory. Although FIG. 1 illustrates that system 101 and user device 112 are separate from each other, in some embodiments user device 112 and system 101 can be integrated into a single device.

In some embodiments, a user may operate on user device 112 and may input a user inquiry through user device 112. User device 112 may send the user inquiry to system 101 through network 110. The user inquiry may include one or more parameters for requesting a high-resolution remote sensing image. The one or more parameters may include one or more of a location (or a geographical region of interest), a specified time (or a specified time window), a resolution, a size of the requested high-resolution remote sensing image, etc. The location can be a geographical location or a surface location on Earth. For example, the location can include a longitude and a latitude, an address (e.g., a street, city, state, country, etc.), a place of interest, etc. The high-resolution remote sensing image may depict a scene or a landscape at the location.

Referring to FIG. 1 again, training data generator 105 may be configured to generate a training dataset for training a deep learning model, as described below in more details. In some embodiments, the training dataset may include one or more sets of multi-temporal images with an input resolution. Each set of multi-temporal images may include one or more remote sensing images that capture a scene or a landscape of a location at one or more different times with the input resolution. The training dataset may also include one or more first target images with a first output resolution, with the first output resolution higher than the input resolution. The one or more first target images may include one or more remote sensing images with the first output resolution, and may correspond to the one or more sets of multi-temporal images, respectively.

For example, the training dataset may include: (1) a first set of multi-temporal images that captures a scene of a first location at a first set of times with an input resolution of 10 meters, and a corresponding first target image that captures the scene of the first location at a different time with a first output resolution of 2.5 meters; and (2) a second set of multi-temporal images that captures a scene of a second location at a second set of times with the input resolution of 10 meters, and a corresponding first target image that captures the scene of the second location at a different time with the first output resolution of 2.5 meters.

In some embodiments, training data generator 105 may generate, from one or more data sources 108, the one or more sets of multi-temporal images with the input resolution and the one or more first target images with the first output resolution. For example, for each set of multi-temporal images and a first target image associated with the corresponding set of multi-temporal images, training data generator 105 may generate the first target image from a first data source 108 that includes remote sensing images with a first source resolution. Training data generator 105 may generate the corresponding set of multi-temporal images from both first data source 108 and a second data source 108, where second data source 108 includes remote sensing images with a second source resolution.

Specifically, training data generator 105 may obtain a first source image with the first source resolution from first data source 108. The first source resolution is higher than the first output resolution. Training data generator 105 may also retrieve metadata associated with the first source image from first data source 108. The metadata may include geographical location data associated with a scene or landscape captured by the first source image. Training data generator 105 may downsample the first source image with the first source resolution to generate the first target image with the first output resolution. The first target image may have a size of T1×T1 with the first output resolution R1, where T1 and R1 are positive integers.

Training data generator 105 may determine a location of the first target image. For example, training data generator 105 may determine a geographic location of the first target image based on the metadata of the first source image. The location of the first target image can be, for example, a geographic location of a reference point (e.g., a center point) in the first target image, a geographical location of a scene or a place of interest captured by the first target image.

Training data generator 105 may also downsample the first target image with the first output resolution to generate a first remote sensing image with the input resolution. The first remote sensing image may have a size of T0×T0 with the input resolution R0, where R1>R0, T1>T0, and T0 and R0 are positive integers. As a result, the first remote sensing image and the first target image may capture a scene of the same location with different resolutions at the same time. For example, a geographical location of a reference point of the first remote sensing image is identical to a geographical location of a reference point of the first target image.

Next, training data generator 105 may obtain one or more second remote sensing images with the input resolution from second data source 108 based on the location of the first target image. For example, training data generator 105 may obtain one or more second source images with the second source resolution from second data source 108 based on the location of the first target image. The one or more second source images may include one or more image patches that capture a scene of the same location as the first target image at one or more different times, respectively. Training data generator 105 may generate the one or more second remote sensing images based on the one or more second source images.

For example, if the second source resolution is equal to the input resolution, training data generator 105 may crop the one or more second source images into the one or more second remote sensing images with the size of T0×T0, respectively. The one or more second remote sensing images may capture the scene of the same location as the first target image at the one or more different times. A geographical location of a reference point of each second remote sensing image can be identical to a geographical location of a reference point of the first target image. In another example, if the second source resolution is greater than the input resolution, training data generator 105 may downsample the one or more second source images to generate the one or more second remote sensing images. In yet another example, if the second source resolution is smaller than the input resolution, training data generator 105 may upsample the one or more second source images to generate the one or more second remote sensing images.

As a result, training data generator 105 may aggregate the first remote sensing image captured at a first time and the one or more second remote sensing images captured at different times to generate a set of multi-temporal images. By performing similar operations, training data generator 105 may generate one or more sets of multi-temporal images and one or more first target images correspondingly. Then, training data generator 105 may associate the one or more sets of multi-temporal images with the one or more first target images to generate a training dataset. For example, in the training dataset, each set of multi-temporal images is paired with a corresponding first target image from the one or more first target images.

In some embodiments, one or more geographical regions of interest can be selected purposefully, and the one or more sets of multi-temporal images can be generated based on the one or more geographical regions of interest. For example, a geographical region with heavy haze can be selected to produce various sets of multi-temporal images, so that a deep learning model can be trained using the various sets of multi-temporal images to address the haze issue associated with the geographical region of interest. In some other embodiments, the one or more geographical regions of interest can be selected randomly.

In some embodiments, certain types of source images can be selected to generate the one or more sets of multi-temporal images. For example, NAIP images and Sentinel-2 images with heavy clouds, haze, fog, etc., can be selected as source images to generate the one or more sets of multi-temporal images. In another example, NAIP images and Sentinel-2 images with negligible clouds, haze, fog, etc., can be selected as source images to generate the one or more sets of multi-temporal images. In some other embodiments, random source images can be selected to generate the one or more sets of multi-temporal images.

In some embodiments, training data generator 105 may further process each set of multi-temporal images to improve an image match in the corresponding set of multi-temporal images. For example, because each set of multi-temporal images may include remote sensing images from different data sources 108, the colors of the remote sensing images may be different. By performing a histogram matching, the colors of the remote sensing images can be matched to avoid overfitting issues in the training of the deep learning model.

For example, assume that a set of multi-temporal images may include a first remote sensing image from first data source 108 and one or more second remote sensing images from second data sources 108. Training data generator 105 may perform a histogram matching between the first remote sensing image and the one or more second remote sensing images, so that a color differentiation between the first remote sensing image and each second remote sensing image is modified to be within a predetermined range. Specifically, for each channel (e.g., each Red, Green or Blue (RGB) channel), training data generator 105 manipulates pixels of the corresponding channel from each second remote sensing image, such that a histogram of the second remote sensing image is matched to a histogram of the first remote sensing image. For example, a cumulative histogram of the second remote sensing image is modified to be identical to a cumulative histogram of the first remote sensing image for each channel.

In some embodiments, training data generator 105 may perform other operations to improve an image match in each set of multi-temporal images. For example, training data generator 105 may adjust an orientation of each second remote sensing image to be the same as an orientation of the first remote sensing image.

In some embodiments, the training dataset may also include one or more second target images with a second output resolution. The second output resolution is higher than the first output resolution. The one or more second target images may correspond to the one or more first target images, respectively. For example, for each first target image that is generated from a first source image from first data source 108, training data generator 105 may also downsample the first source image to generate a second target image with the second output resolution. The second target image may have a size of T2×T2 with the second output resolution R2, where R2>R1>R0, T2>T1>T0, and T2 and R2 are positive integers. The second target image and the first target image are obtained from the same first source image, and may capture a scene or a landscape of the same location with different resolutions. For example, a geographical location of a reference point of the second target image can be identical to a geographical location of a reference point of the first target image.

Still referring to FIG. 1, training module 106 may be configured to receive the training dataset from training data generator 105. Training module 106 may train a deep learning model using the training dataset, as described below in more details. In some embodiments, the deep learning model may include one or more of a multi-temporal neural network model and a single-image neural network model. The single-image neural network model can be cascaded to the multi-temporal neural network model. A structure of the multi-temporal neural network model is described below in more details with reference to FIGS. 3A-3C. A structure of the single-image neural network model is described below in more details with reference to FIG. 4.

In some embodiments, the multi-temporal neural network model can be configured to process each set of multi-temporal images to generate a corresponding first output image with the first output resolution. Training module 106 may feed each set of multi-temporal images to the multi-temporal neural network model to generate a corresponding first output image with the first output resolution. As a result, training module 106 may generate one or more first output images with the first output resolution for the one or more sets of multi-temporal images, respectively. Training module 106 may evaluate the multi-temporal neural network model based on a comparison between the one or more first output images and the one or more first target images to produce a first evaluation result, and may update the multi-temporal neural network model based on the first evaluation result.

An exemplary training process for the multi-temporal neural network model is described herein. For example, the multi-temporal neural network model can be trained by a predetermined number of epochs. The training dataset may include training samples (e.g., various sets of multi-temporal images and corresponding first target images) for the predetermined number of epochs. Alternatively, training data generator 105 may generate a different training dataset for each epoch. For each training iteration (each epoch), a portion or all of the training samples in a training dataset are evaluated in batches. For example, a stochastic gradient descent (SGD) approach can be used to evaluate the samples in batches. Initially, training module 106 may initialize weights in the multi-temporal neural network model. For example, all the weights may be set equal to begin with. As another example, the weights may be set using the weights of a previously trained multi-temporal neural network model.

In this exemplary training process, training module 106 may feed one or more sets of multi-temporal images to the multi-temporal neural network model to obtain one or more first output images. Training module 106 may compare the one or more first output images with the one or more first target images to evaluate a loss function. Training module 106 may generate a loss of the multi-temporal neural network model using the loss function. The loss measures the difference between the one or more first output images and the one or more first target images, thus indicating the performance of the multi-temporal neural network model with the weights in the current iteration.

In this exemplary training process, training module 106 may determine whether the loss of the current iteration is improved over the last iteration. For example, training module 106 determines whether the loss decreases with respect to a previous loss calculated in a previous iteration. If the loss is improved (e.g., the loss decreases with respect to the previous loss), training module 106 may update the weights of the multi-temporal neural network model. A structure, weights and other parameters of the multi-temporal neural network model may be stored in storage 104. After training the multi-temporal neural network model for the predetermined number of epochs, training module 106 can stop training the multi-temporal neural network model, and the trained multi-temporal neural network model can be provided for subsequent super-resolution image processing.

In some embodiments, the single-image neural network model can be configured to process an input image with the first output resolution to generate a second output image with the second output resolution. The training dataset may further include one or more second target images with the second output resolution. Training module 106 may feed each first target image to the single-image neural network model to generate a corresponding second output image with the second output resolution, so that one or more second output images with the second output resolution are generated for the one or more first target images.

Then, training module 106 may evaluate the single-image neural network model based on a comparison between the one or more second output images and the one or more second target images to produce a second evaluation result. Training module 106 may update the single-image neural network model based on the second evaluation result. A training process for the single-image neural network model may be similar to that of the multi-temporal neural network model, and similar description will not be repeated here.

Still referring to FIG. 1, inquiry module 107 can be configured to provide a high-resolution remote sensing image in response to an inquiry. For example, inquiry module 107 may receive one or more parameters from user device 112. Inquiry module 107 may determine, from one or more data sources 108, an input set of multi-temporal images based on the one or more parameters. The input set of multi-temporal images may include a set of remote sensing images with the input resolution captured at a set of times for a scene. Inquiry module 107 may apply the input set of multi-temporal images to the deep learning model to generate a high-resolution remote sensing image. The high-resolution remote sensing image may have a resolution higher than the input resolution.

In some embodiments, inquiry module 107 may feed the input set of multi-temporal images to the multi-temporal neural network model to generate the high-resolution remote sensing image with the first output resolution. In this case, the high-resolution remote sensing image may have the first output resolution R1 that is M1 times (×M1) of the input resolution R0 (e.g., M1=R1/R0, M1 being a positive integer).

In some embodiments, inquiry module 107 may feed the input set of multi-temporal images to the multi-temporal neural network model to generate an intermediate output image with the first output resolution. Next, inquiry module 107 may feed the intermediate output image to the single-image neural network model to generate the high-resolution remote sensing image with the second output resolution. In this case, the high-resolution remote sensing image may have the second output resolution R2. The second output resolution R2 is M2 times (×M2) of the first output resolution R1 (e.g., M2=R2/R1) and M3 times (×M3) of the input resolution R0 (e.g., M3=M1×M2=R2/R0), where M2 and M3 are positive integers. Inquiry module 107 is described below in more details with reference to FIGS. 8-9.

Consistent with FIG. 1, a data generation example for generating a set of multi-temporal images and corresponding target images (e.g., first and second target images) from the Sentinel-2 data source and the NAIP data source is described herein. Generally, training of the deep learning model needs training data with both low-resolution multi-temporal images (e.g., low-resolution remote sensing images) and corresponding target images (e.g., high-resolution remote sensing images) of the same geographical location. However, a single satellite data source, such as the Sentinel-2 data source or the NAIP data source, may not be able to provide both the low-resolution remote sensing images and the corresponding high-resolution remote sensing images. As a result, the training data can be generated from a combination of two satellite data sources, such as the NAIP images and the Sentinel-2 images.

Specifically, the NAIP images may have a resolution of 0.6 meters, and can be used to generate the first and second target images. A revisit period of the NAIP images is relatively long (e.g., 2-3 years). The Sentinel-2 images may have a resolution of 10 meters, and can be used to generate the low-resolution multi-temporal images. The revisit period of the Sentinel-2 images is relatively short (e.g., about 10 days). However, if only Sentinel-2 images are used to generate the low-resolution multi-temporal images, a training performance of the deep learning model may be degraded. This is because the first and second target images in the training dataset are obtained from the NAIP data source, which is different from the Sentinel-2 data source. To compensate for image mismatch or misalignment caused by the different data sources, the NAIP images can also be used to generate part of the low-resolution multi-temporal images.

In this data generation example, assume that: (1) each input image to the multi-temporal neural network model may have a size of 256*256 with an input resolution of 10 meters; (2) an output image from the multi-temporal neural network may have a size of 1024*1024 with a first output resolution of 2.5 meters; (3) each input image to the single-image neural network model may have a size of 1024*1024 with the first output resolution of 2.5 meters; and (4) an output image from the single-image neural network may have a size of 4096*4096 with a second output resolution of 0.625 meters. In other words, the multi-temporal neural network model may enhance the input resolution by 4 times (×4) to reach the first output resolution. The single image neural network model may enhance the first output resolution by 4 times (×4) to reach the second output resolution. As a result, the deep learning model can enhance the input resolution by 16 times (×16) (e.g., from the input resolution of 10 meters to the second output resolution of 0.625 meters).

In this data generation example, training data generator 105 may obtain an NAIP image from the NAIP data source. The NAIP image can be an image tile that is captured by a satellite and may cover an area of about 10,000 square meters. Training data generator 105 may also retrieve metadata associated with the NAIP image from the NAIP data source. The metadata may include location data describing a geographical region covered by the NAIP image and a time when the NAIP image is taken.

Training data generator 105 may downsample the NAIP image with the resolution of 0.6 meters to produce a first NAIP target image with the size of 1024*1024 and the first output resolution of 2.5 meters. Training data generator 105 may determine a geographical location of the first NAIP target image based on the metadata of the NAIP image. Training data generator 105 may also downsample the first NAIP target image to produce an NAIP input image with a size of 256*256 and the input resolution of 10 meters. Next, training data generator 105 may also downsample the NAIP image with the resolution of 0.6 meters to produce a second NAIP target image with the size of 4096*4096 and the second output resolution of 0.625 meters. The NAIP input image, the first NAIP target image and the second NAIP target image may cover the same geographical location.

Additionally, training data generator 105 may obtain one or more Sentinel-2 image tiles with the input resolution of 10 meters from the Sentinel-2 data sources based on the geographical location of the first NAIP target image. For example, each of the one or more Sentinel-2 image tiles also covers the geographical location of the first NAIP target image. The one or more Sentinel-2 image tiles may be captured by a satellite at one or more different times. Training data generator 105 may crop each Sentinel-2 image tile into a Sentinel-2 input image with the size of 256*256 and the input resolution of 10 meters, so that one or more Sentinel-2 input images are generated from the one or more Sentinel-2 image tiles. The one or more Sentinel-2 input images also cover the same geographical location as the first NAIP target image.

Training data generator 105 may aggregate the NAIP input image and the one or more Sentinel-2 input images to generate a set of multi-temporal images. Then, training data generator 105 may associate the set of multi-temporal images with the first and second NAIP target images in a training dataset. Since the NAIP input image and the one or more Sentinel-2 input images are from different data sources, training data generator 105 may perform a histogram matching between the NAIP input image and each Sentinel-2 input image for each channel, so that the color of each Sentinel-2 input image is matched to the color of the NAIP input image.

Figure 2:
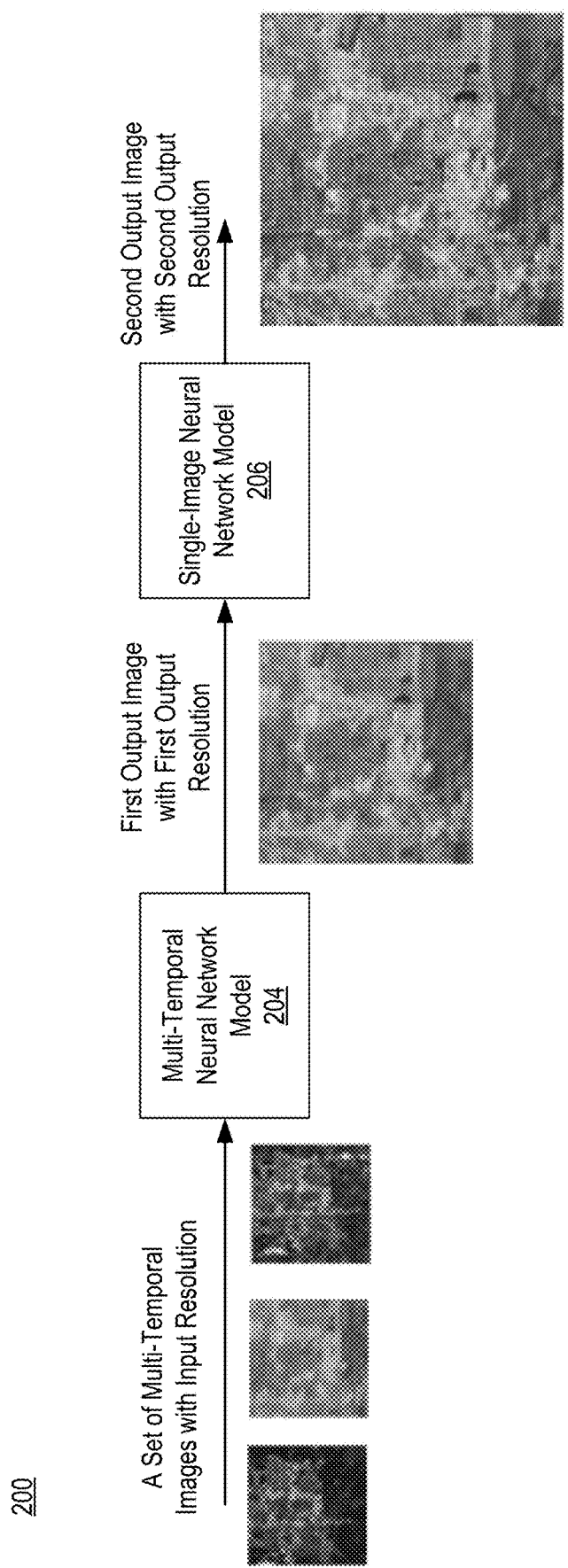
FIG. 2 illustrates a schematic diagram of an exemplary structure of a deep learning model for super-resolution image processing, according to embodiments of the disclosure.

FIG. 2 illustrates a schematic diagram 200 of an exemplary structure of a deep learning model for super-resolution image processing, according to embodiments of the disclosure. The deep learning model may include a multi-temporal neural network model 204. Multi-temporal neural network model 204 may take a set of multi-temporal images with an input resolution as an input, and may produce a first output image with a first output resolution. An example of multi-temporal neural network model 204 can be an enhanced deformable video restoration (EDVR) model (e.g., a video restoration with enhanced deformable convolutional networks).

In some embodiments, the deep learning model may additionally include a single-image neural network model 206 that is cascaded to multi-temporal neural network model 204. Single-image neural network model 206 may take an image with the first output resolution (e.g., the first output image) as an input, and may produce a second output image with a second output resolution. An example of single-image neural network model 206 can be an enhanced super-resolution generative adversarial network (ESRGAN) model.

Consistent with FIG. 2, through an application of multi-temporal neural network 204 that uses multi-temporal images as an input, an influence of weather conditions such as occlusion by clouds, haze, fog, etc., can be reduced or eliminated in the first output image. Then, single-image neural network model 206 can be used to enlarge the first output image to generate the second output image with the second output resolution. The second output image may have an improved quality since an influence of the occlusion by clouds, haze, fog, etc., is reduced or eliminated in the first output image.

Figure 3A:
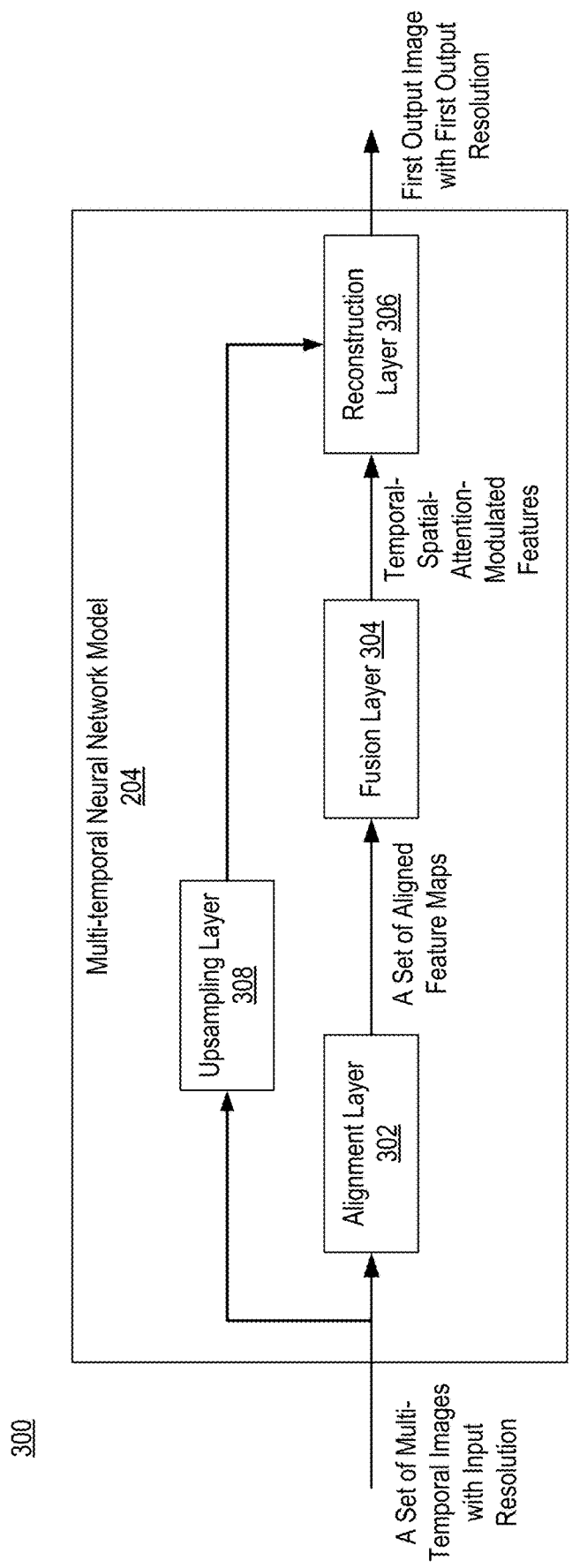
FIG. 3A illustrates a schematic diagram of an exemplary structure of a multi-temporal neural network model, according to embodiments of the disclosure.

FIG. 3A illustrates a schematic diagram 300 of an exemplary structure of multi-temporal neural network model 204, according to embodiments of the disclosure. Multi-temporal neural network model 204 may include one or more of an alignment layer 302, a fusion layer 304, a reconstruction layer 306 and an upsampling layer 308. Alignment layer 302, fusion layer 304 and reconstruction layer 306 can be applied in series, while upsampling layer 308 can be applied in parallel with alignment layer 302 and fusion layer 304.

In some embodiments, alignment layer 302 can be configured to align a set of multi-temporal images at a feature level to generate a set of aligned feature maps. Alignment layer 302 is described below in more details with reference to FIG. 3B. Fusion layer 304 may be configured to fuse the set of aligned feature maps with temporal attention and spatial attention to generate a group of temporal-spatial-attention modulated features for the set of multi-temporal images. Fusion layer 304 is described below in more details with reference to FIG. 3C.

Reconstruction layer 306 may be configured to reconstruct an image residual from the group of temporal-spatial-attention modulated features. For example, reconstruction layer 306 may include a cascade of residual blocks or any other advanced reconstruction modules in single-image super-resolution technologies. The group of temporal-spatial-attention modulated features can be passed through reconstruction layer 306 to produce the image residual.

Reconstruction layer 306 may also be configured to generate a first output image based on the image residual and a reference image in the set of multi-temporal images. For example, upsampling layer 308 may upsample the reference image to generate a direct upsampled image with the first output resolution. Reconstruction layer 306 may up sample the image residual to generate an upsampled image residual with the first output resolution, and may add the up sampled image residual to the direct up sampled image to produce the first output image. Consistent with the present disclosure, the reference image can be any image in the set of multi-temporal images. For example, the reference image can be an NAIP input image generated from the NAIP data source or a Sentinel-2 input image generated from the Sentinel-2 data source.

Figure 3B:
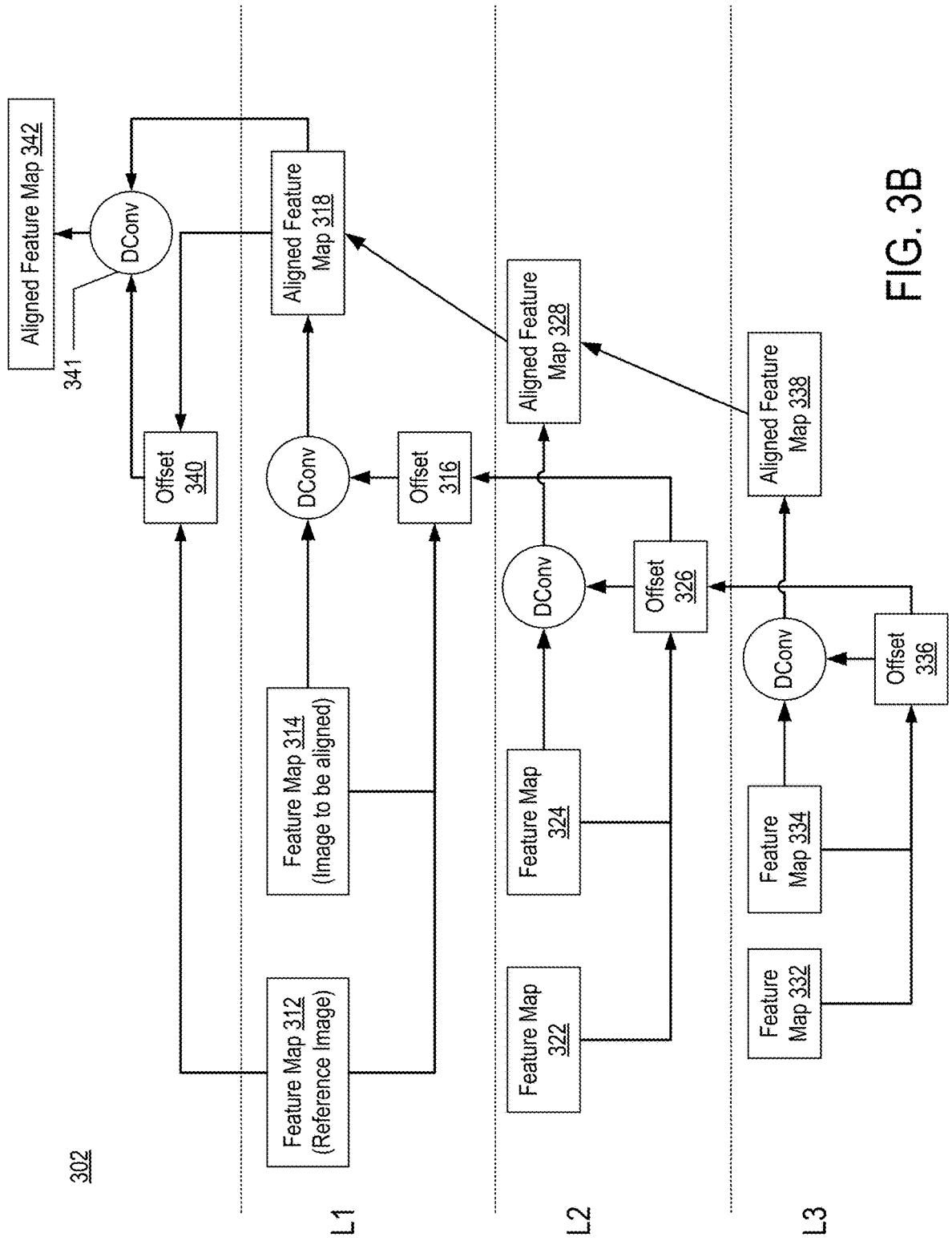
FIG. 3B illustrates an exemplary flow of operations performed by an alignment layer in a multi-temporal neural network model, according to embodiments of the disclosure.

FIG. 3B illustrates an exemplary flow of operations performed by alignment layer 302 in a multi-temporal neural network model, according to embodiments of the disclosure. In some embodiments, alignment layer 302 may be configured to align features of each image in a set of multi-temporal images to features of a reference image in the set of multi-temporal images. In FIG. 3B, a three-level pyramid is shown, with levels L1, L2 and L3.

In some embodiments, for each image in the set of multi-temporal images, alignment layer 302 may generate a feature map at a first level L1 by using a strided convolution filter to downsample the image by a factor of 2. For an $S^{th}$ level with $2 \leq S \leq 3$, alignment layer 302 may generate a feature map at the $S^{th}$ level by using a strided convolution filter to downsample a feature map at an $(S-1)^{th}$ level by a factor of 2. For example, for the reference image, a feature map 312 at the first level L1, a feature map 322 at a second level L2, and a feature map 332 at a third level L3 can be generated. For an image to be aligned with the reference image, a feature map 314 at the first level L1, a feature map 324 at the second level L2, and a feature map 334 at the third level L3 can be generated.

At the third level L3, alignment layer 302 may generate an offset 336 based on a concatenation of feature map 332 of the reference image and feature map 334 of the image to be aligned. Alignment layer 302 may generate an aligned feature map 338 at the third level L3 based on a deformable convolution (DConv) of feature map 334 of the image to be aligned and offset 336 of the third level L3.

At an $S^{th}$ level with $1 \leq S \leq 2$ (e.g., L1 or L2 level), alignment layer 302 may generate an offset at the $S^{th}$ level based on: (1) a concatenation of a feature map of the reference image at the $S^{th}$ level and a feature map of the image to be aligned at the $S^{th}$ level; and (2) a 2-times (×2) upsampling of an offset at the $(S+1)^{th}$ level. For example, an offset 326 at the second level L2 is generated based on: (1) a concatenation of feature map 322 of the reference image and feature map 324 of the image to be aligned; and (2) a 2-times (×2) upsampling of offset 336 at the third level L3. Similarly, an offset 316 at the first level L1 can be generated.

At an $S^{th}$ level with $1 \leq S \leq 2$ (e.g., L1 or L2 level), alignment layer 302 may generate an aligned feature map at the $S^{th}$ level based on: (1) a deformable convolution of a feature map of the image to be aligned at the $S^{th}$ level and the offset at the $S^{th}$ level; and (2) a 2-times (×2) upsampling of an aligned feature map at the $(S+1)^{th}$ level. For example, an aligned feature map 328 at the second level L2 is generated based on: (1) a deformable convolution of feature map 324 of the image to be aligned and offset 326 at the second level L2; and (2) a 2-times (×2) upsampling of aligned feature map 338 at the third level L3. Similarly, an aligned feature map 318 at the first level L1 can be generated.

An offset 340 above the first level L1 can be generated based on a concatenation of feature map 312 of the reference image and aligned feature map 318 at the first level L1. An aligned feature map 342 outputted by alignment layer 302 for the image to be aligned can be generated based on a deformable convolution of aligned feature map 318 and offset 340.

By performing operations similar to those described above for FIG. 3B, alignment layer 302 may generate a set of aligned feature maps for the set of multi-temporal images. For example, if the set of multi-temporal images includes an NAIP input image and one or more Sentinel-2 input images, alignment layer 302 may align features of each Sentinel-2 input image with features of the NAIP input image to generate the set of aligned feature maps. As a result, mismatch or misalignment between each Sentinel-2 input image and the NAIP input image can be reduced or eliminated.

Consistent with FIG. 3B, alignment layer 302 uses deformable convolutions to align each image in the set of multi-temporal images to the reference image at the feature level. This alignment can be performed in a coarse-to-fine manner. Specifically, a pyramid structure is used which first aligns features in lower scales with coarse estimations, and then propagates the offsets and aligned feature maps to higher scales. An additional deformable convolution 341 after the pyramidal alignment operation is used to further improve the robustness of the alignment.

Figure 3C:
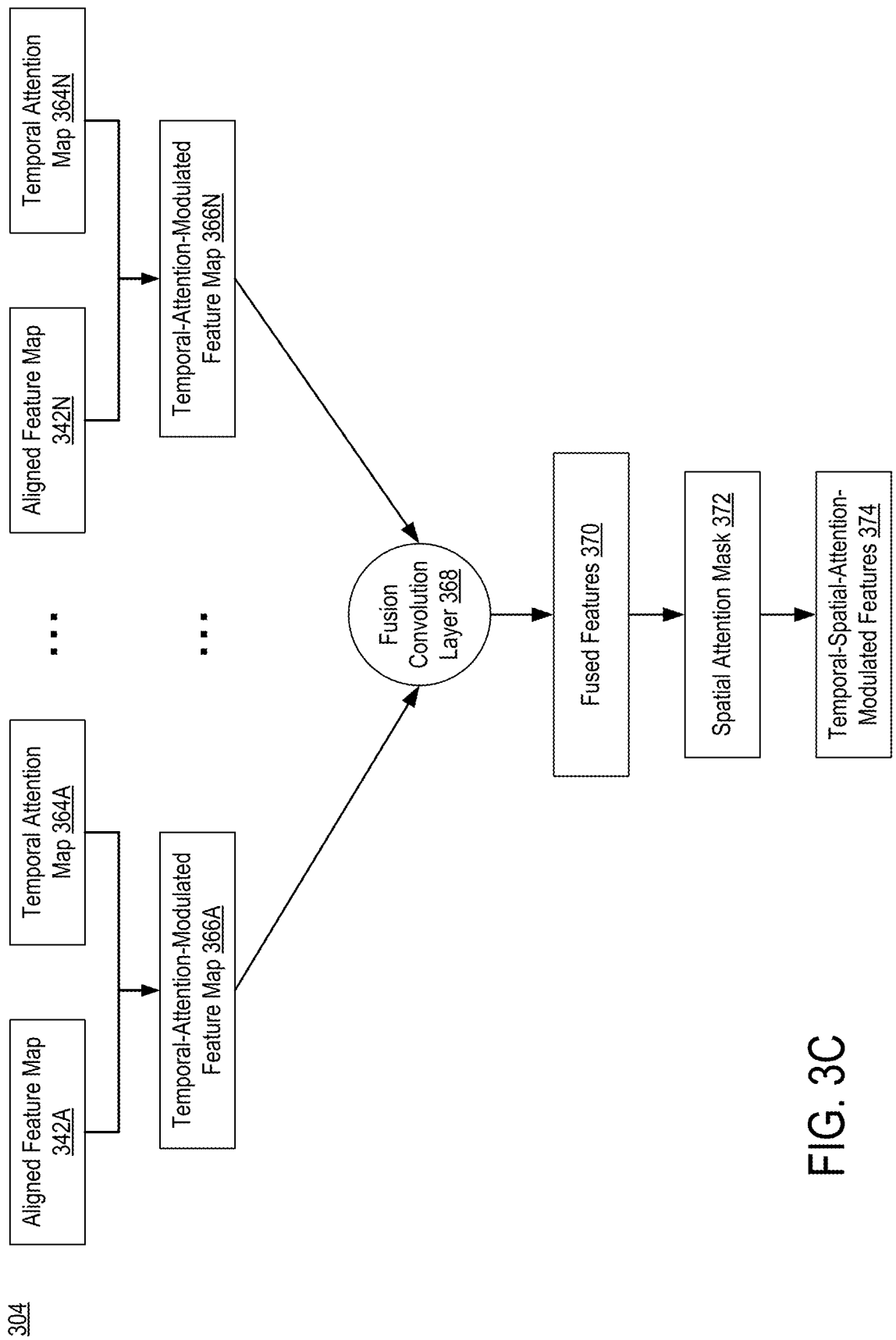
FIG. 3C illustrates an exemplary flow of operations performed by a fusion layer in a multi-temporal neural network model, according to embodiments of the disclosure.

FIG. 3C illustrates an exemplary flow of operations performed by fusion layer 304 in a multi-temporal neural network model, according to embodiments of the disclosure. In some embodiments, fusion layer 304 receives, from alignment layer 302, a set of aligned feature maps 342A, . . . , 342N for a set of multi-temporal images.

Fusion layer 304 may generate a temporal attention map for each image in the set of multi-temporal images. Specifically, fusion layer 304 may compute a similarity distance between the image and a reference image based on an aligned feature map of the image and an aligned feature map of the reference image. Intuitively, an image that is more similar to the reference image can be paid more attention. The similarity distance can be used as a temporal attention map for the image. For example, a temporal attention map 364A for a first image can be computed based on aligned feature map 342A of the first image and an aligned feature map of the reference image. Similarly, a temporal attention map 364N for a second image can be computed.

Fusion layer 304 may generate a temporal-attention-modulated feature map for each image by multiplying the aligned feature map of the image with the temporal attention map of the image in a pixel-wise manner. For example, a temporal-attention-modulated feature map 366A for the first image can be generated by multiplying aligned feature map 342A of the first image with temporal attention map 364A of the first image in a pixel-wise manner. Similarly, a temporal-attention-modulated feature map 366N can be generated for the second image.

Next, fusion layer 304 may apply a fusion convolution layer 368 to aggregate all the temporal-attention-modulated feature maps associated with the set of multi-temporal images to generate fused features 370. Fusion layer 304 may compute a spatial attention mask 372 from fused features 370. Fusion layer 304 may modulate fused features 370 with spatial attention mask 372 through element-wise multiplication and addition to output a group of temporal-spatial-attention-modulated features 374.

Consistent with FIG. 3C, through an application of fusion layer 304, features in the set of multi-temporal images can be provided with different weights in a temporal dimension as well as a spatial dimension. Thus, an occlusion problem incurred by obstruction of clouds, fog, haze, etc., can be solved by inputting multi-temporal images into the multi-temporal neural network model. For example, a temporal attention map of an image can be obtained through a computation of a similarity distance between the image and a reference image. Then, the temporal attention map of the image can be multiplied with an aligned feature map of the image, which is equivalent to adjust weights of the image for occlusion reduction and resolution enhancement.

Figure 4:
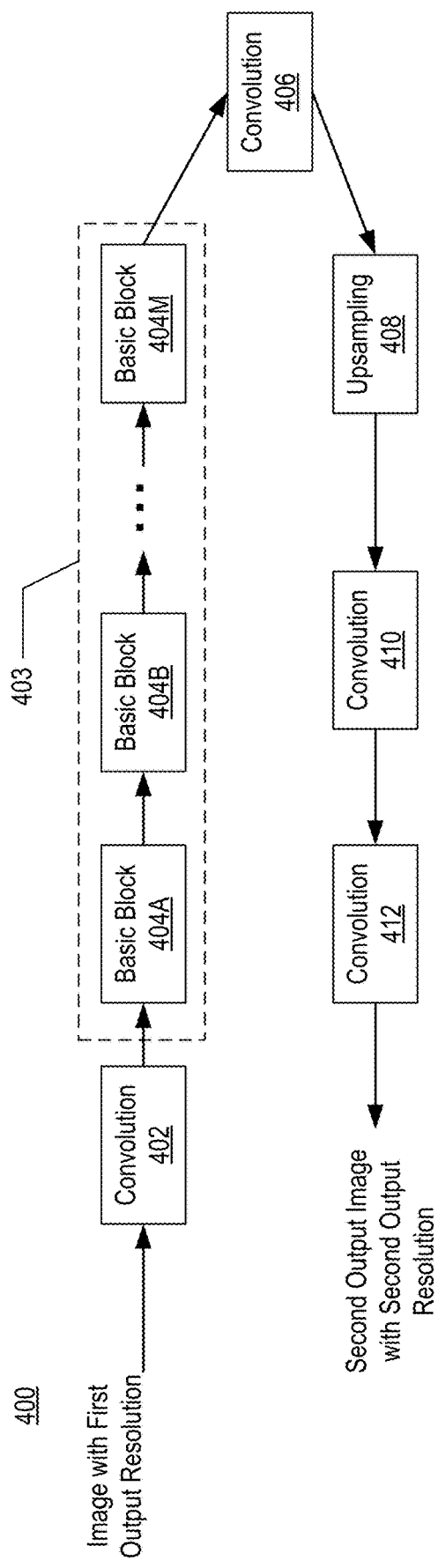
FIG. 4 illustrates a schematic diagram of an exemplary structure of a single-image neural network model included in a deep learning model, according to embodiments of the disclosure.

FIG. 4 illustrates a schematic diagram 400 of an exemplary structure of a single-image neural network model (e.g., single-image neural network model 206) included in a deep learning model, according to embodiments of the disclosure. The single-image neural network model may include one or more of a convolution 402, a block series 403, a convolution 406, an upsampling operation 408, and convolutions 410 and 412. Convolution 402, block series 403, convolution 406, upsampling operation 408, and convolutions 410 and 412 are applied in series. Block series 403 may include basic blocks 404A, 404B, . . . , 404N that are applied in series. Each basic block can be a residual block, a dense block or a residual-in-residual dense block. The single-image neural network model takes an image with a first output resolution as an input, and produces a second output image with a second output resolution.

Figure 5:
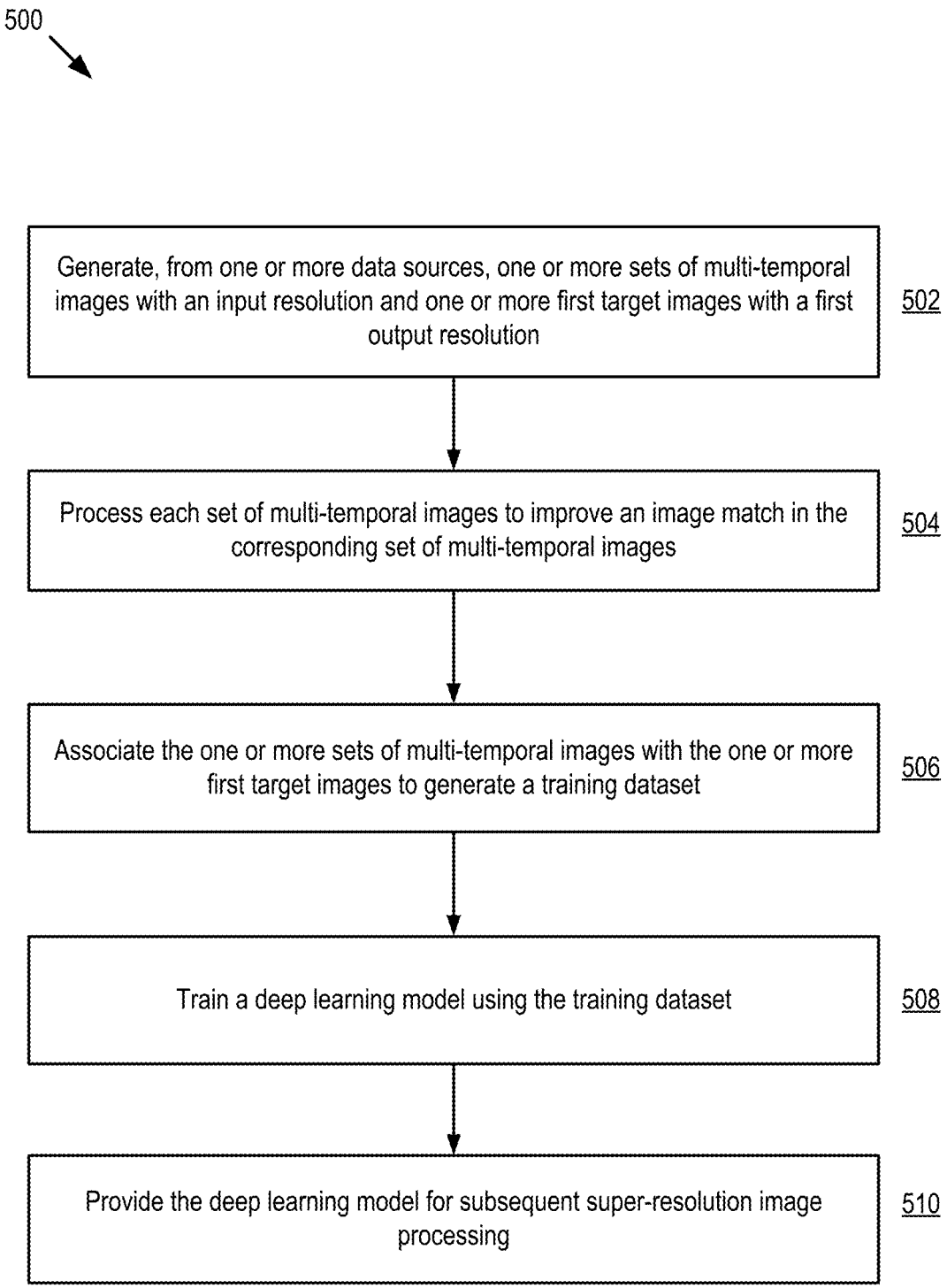
FIG. 5 is a flowchart of an exemplary method for super-resolution image processing in remote sensing, according to embodiments of the disclosure.

FIG. 5 is a flowchart of an exemplary method 500 for super-resolution image processing in remote sensing, according to embodiments of the disclosure. Method 500 may be implemented by system 101, specifically training data generator 105 and training module 106, and may include steps 502-510 as described below. Some of the steps may be optional to perform the disclosure provided herein. Further, some of the steps may be performed simultaneously, or in a different order than that shown in FIG. 5.

At step 502, training data generator 105 generates, from one or more data sources, one or more sets of multi-temporal images with an input resolution and one or more first target images with a first output resolution.

At step 504, training data generator 105 processes each set of multi-temporal images to improve an image match in the corresponding set of multi-temporal images. For example, a histogram matching can be performed in each set of multi-temporal images.

At step 506, training data generator 105 associates the one or more sets of multi-temporal images with the one or more first target images to generate a training dataset.

At step 508, training module 106 trains a deep learning model using the training dataset. For example, training module 106 feeds each set of multi-temporal images to the deep learning model and evaluates a performance of the deep learning model. Weights of the deep learning model can be updated based on the performance of the deep learning model.

At step 510, training module 106 provides the deep learning model for subsequent super-resolution image processing. For example, training module 106 may store the trained deep learning model in storage 104, so that the trained deep learning model can be used for subsequent super-resolution image processing.

Figure 6:
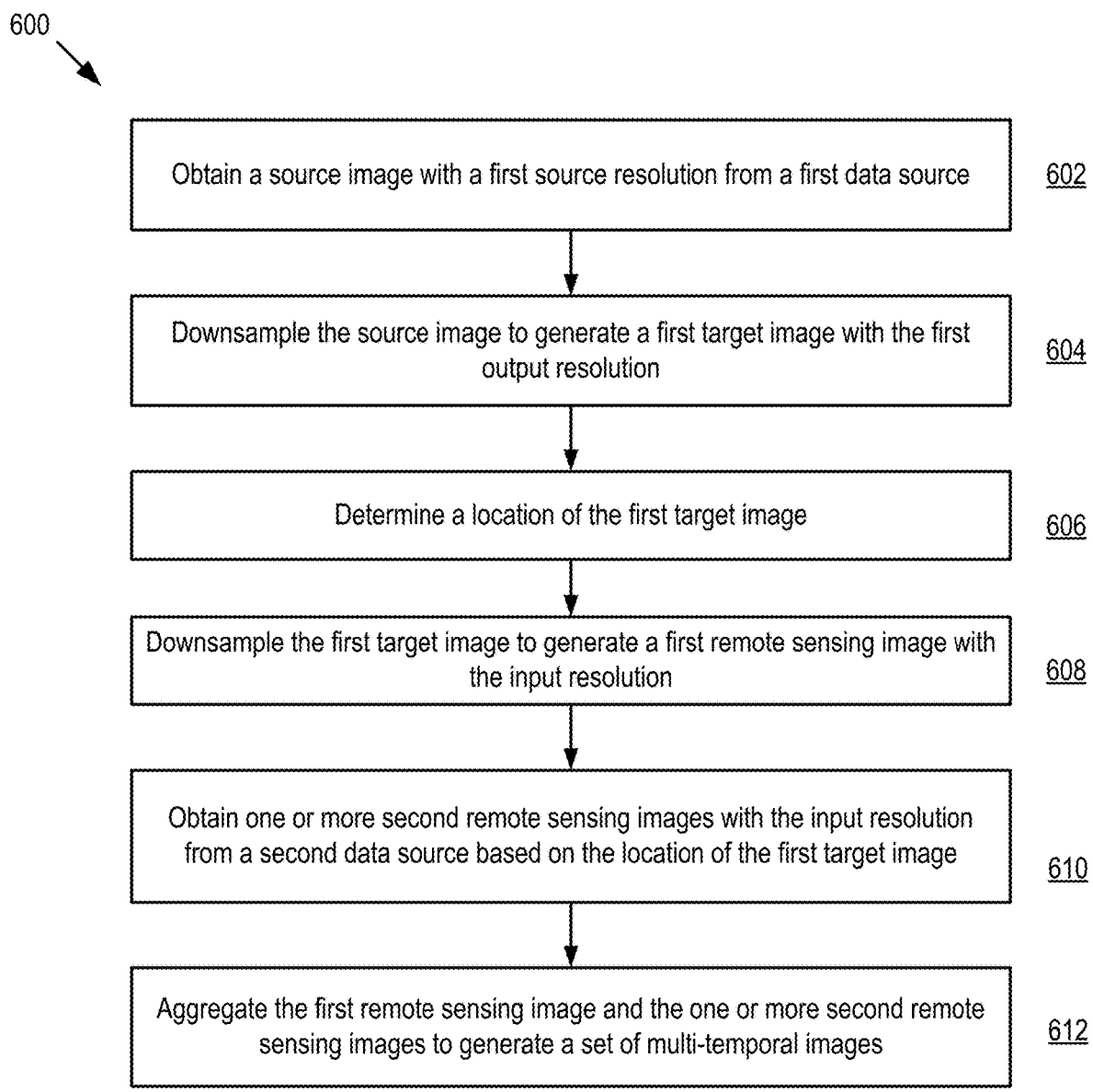
FIG. 6 is a flowchart of an exemplary method for generating a first target image and a set of multi-temporal images, according to embodiments of the disclosure.

FIG. 6 is a flowchart of an exemplary method 600 for generating a first target image and a set of multi-temporal images, according to embodiments of the disclosure. Method 600 may be implemented by system 101, specifically training data generator 105, and may include steps 602-612 as described below. In some embodiments, method 600 may be performed to implement step 502 in FIG. 5. Some of the steps may be optional to perform the disclosure provided herein. Further, some of the steps may be performed simultaneously, or in a different order than that shown in FIG. 6.

At step 602, training data generator 105 obtains a source image with a first source resolution from a first data source.

At step 604, training data generator 105 downsamples the source image to generate a first target image with the first output resolution.

At step 606, training data generator 105 determines a location of the first target image. For example, the location can be a geographical location of a center point of a landscape captured in the first target image.

At step 608, training data generator 105 downsamples the first target image to generate a first remote sensing image with the input resolution.

At step 610, training data generator 105 obtains one or more second remote sensing images with the input resolution from a second data source based on the location of the first target image.

At step 612, training data generator 105 aggregates the first remote sensing image and the one or more second remote sensing images to generate a set of multi-temporal images.

Figure 7:
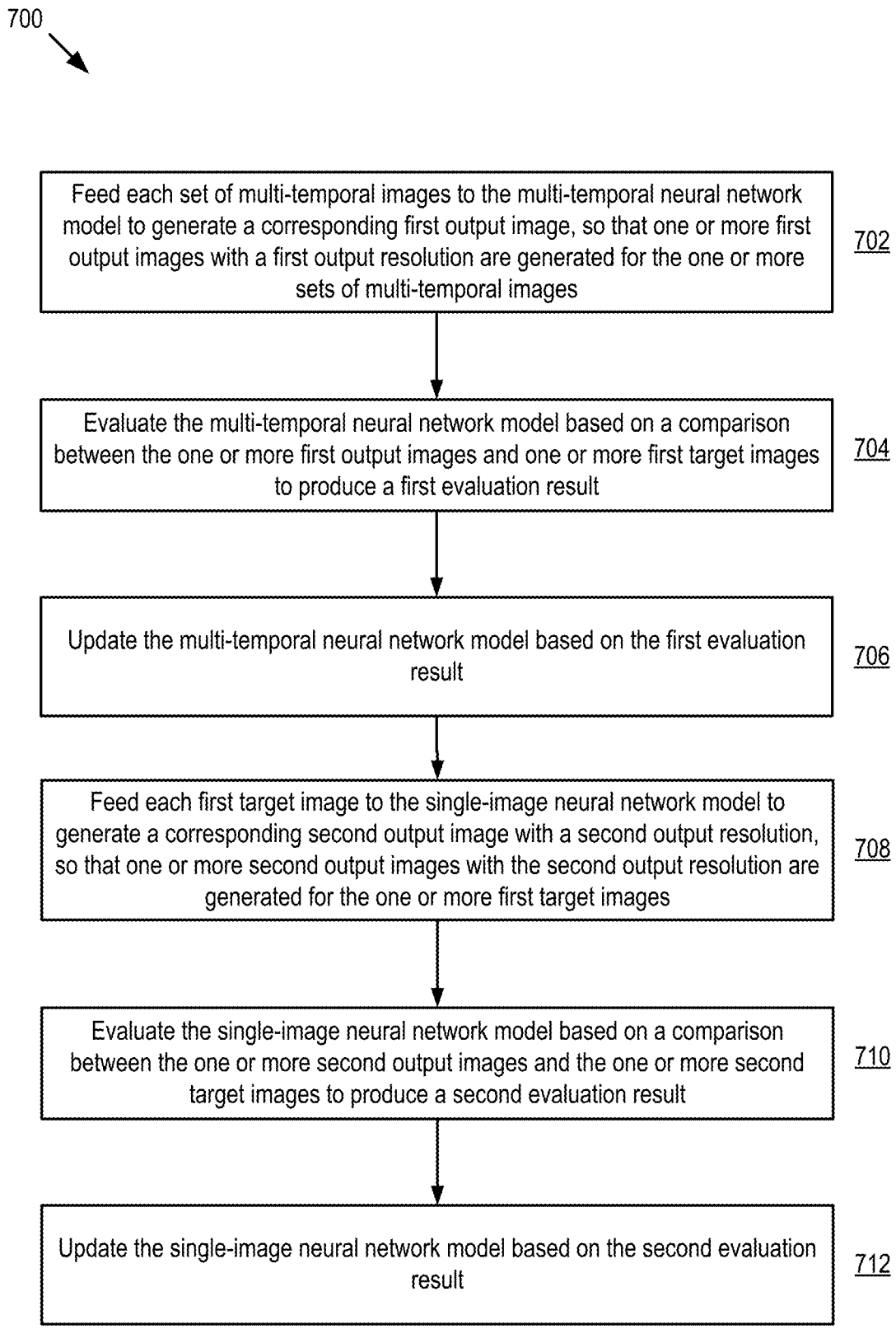
FIG. 7 is a flowchart of an exemplary method for training a deep learning model using a training dataset, according to embodiments of the disclosure.

FIG. 7 is a flowchart of an exemplary method 700 for training a deep learning model using a training dataset, according to embodiments of the disclosure. Method 700 may be implemented by system 101, specifically training module 106, and may include steps 702-712 as described below. In some embodiments, method 700 may be performed to implement step 508 in FIG. 5. Some of the steps may be optional to perform the disclosure provided herein. Further, some of the steps may be performed simultaneously, or in a different order than that shown in FIG. 7.

At step 702, training module 106 feeds each set of multi-temporal images to the multi-temporal neural network model to generate a corresponding first output image. As a result, one or more first output images with a first output resolution are generated for the one or more sets of multi-temporal images.

At step 704, training module 106 evaluates the multi-temporal neural network model based on a comparison between the one or more first output images and one or more first target images to produce a first evaluation result.

At step 706, training module 106 updates the multi-temporal neural network model based on the first evaluation result. For example, one or more weights of the multi-temporal neural network model are updated based on the first evaluation result.

At step 708, training module 106 feeds each first target image to the single-image neural network model to generate a corresponding second output image with a second output resolution. As a result, one or more second output images with the second output resolution are generated for the one or more first target images.

At step 710, training module 106 evaluates the single-image neural network model based on a comparison between the one or more second output images and the one or more second target images to produce a second evaluation result.

At step 712, training module 106 updates the single-image neural network model based on the second evaluation result. For example, one or more weights of the single-image neural network model are updated based on the second evaluation result.

Figure 8:
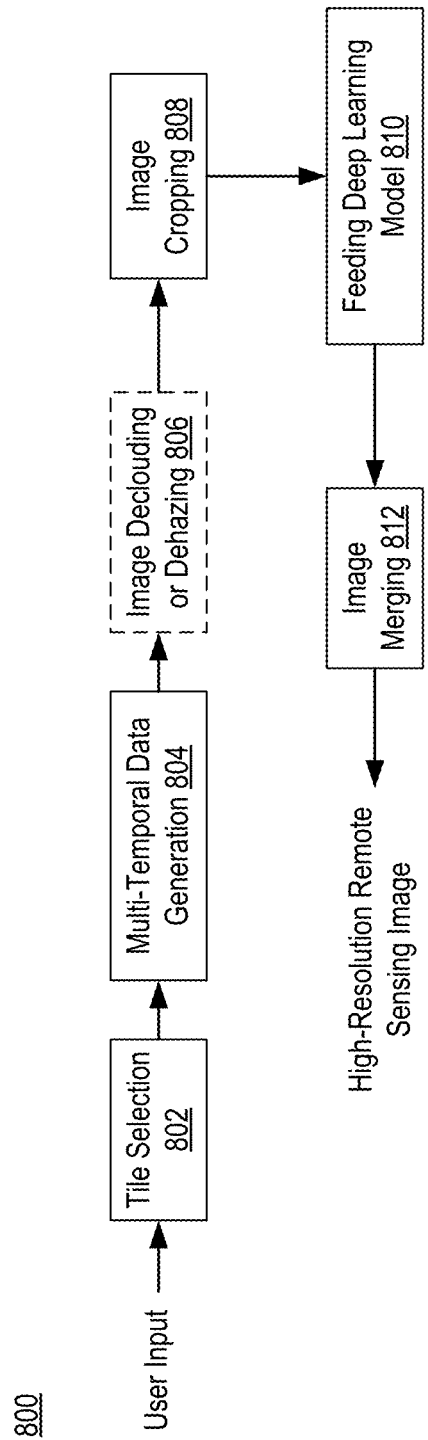
FIG. 8 illustrates an exemplary flow of operations for providing a high-resolution remote sensing image in response to a user inquiry, according to embodiments of the disclosure.

FIG. 8 illustrates an exemplary flow 800 of operations for providing a high-resolution remote sensing image in response to a user inquiry, according to embodiments of the disclosure. A user may operate on user device 112 to provide a user input to inquiry module 107. The user input may specify one or more parameters such as a coordinate of a geographical location, a time (e.g., a date of the year), etc.

Inquiry module 107 may perform a tile selection operation 802 to select a set of image tiles from a data source (e.g., the Sentinel-2 data source) based on the user input. For example, each of the image tiles may capture a scene or landscape at the geographical location specified by the user. The set of image tiles are taken by cameras within a time window close to the time specified by the user. For example, the set of image tiles are taken within ±15 days of the date specified by the user.

Inquiry module 107 may perform a multi-temporal data generation operation 804 to generate an input set of multi-temporal images from the set of image tiles. For example, since each image tile may cover an area of 10,000 square meters, inquiry module 107 may extract an input set of multi-temporal images from the set of image tiles. The input set of multi-temporal images may include a set of image portions from the set of image tiles, and focuses on the geographical location specified by the user.

For example, if the geographical location specified by the user is covered by each single image tile, a portion of each image tile that focuses on the geographical location specified by the user can be extracted to form an image in the input set of multi-temporal images with a size of P0×P0. P0 is a positive integer. In another example, if the geographical location specified by the user is covered by multiple image tiles, portions of the multiple image tiles that focus on the geographical location can be extracted from the multiple image tiles, and can be stitched together to form an image with the size of P0×P0 for the input set of multi-temporal images. The geographical location and the times when the input set of multi-temporal images are taken can be stored in storage 104.

Optionally, inquiry module 107 may perform an image declouding or dehazing operation 806 to remove clouds or haze in the input set of multi-temporal images, so that a clarity of the input set of multi-temporal images can be improved.

In some embodiments, assume that each input image to the deep learning model may have a size of T0×T0 (e.g., 256*256), with T0<P0. Inquiry module 107 may perform an image cropping operation 808 to divide the input set of multi-temporal images into one or more sets of multi-temporal images with the size of T0×T0. Inquiry module 107 may perform a feeding operation 810 to input each set of multi-temporal images to the deep learning model and obtain a corresponding output image with a size of P1×P1 (e.g., 1024*1024 or 4096*4096) from the deep learning model, with P1>T0. As a result, one or more output images can be generated for the one or more sets of multi-temporal images. Each output image can be an image with the first output resolution or an image with the second output resolution, depending on a structure of the deep learning model as described above with reference to FIG. 2.

Inquiry module 107 may perform an image merging operation 812 to combine the one or more output images together to form a high-resolution remote sensing image. For example, the one or more output images can be stitched together to form the high-resolution remote sensing image. The high-resolution remote sensing image may have the first output resolution or the second output resolution, depending on a structure of the deep learning model. Inquiry module 107 may then provide the high-resolution remote sensing image to user device 112.

Figure 9:
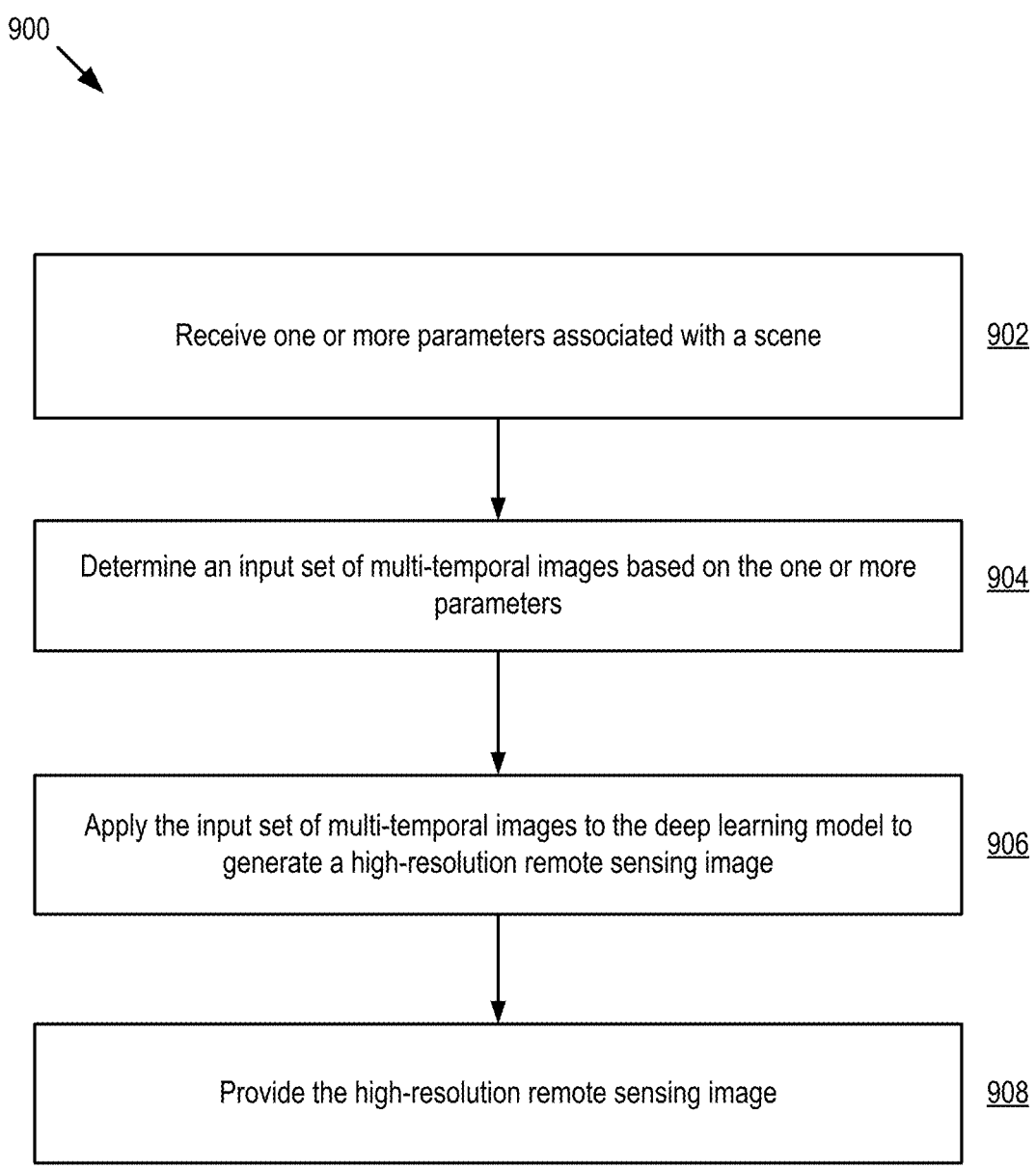
FIG. 9 is a flowchart of an exemplary method for providing a high-resolution remote sensing image, according to embodiments of the disclosure.

FIG. 9 is a flowchart of an exemplary method 900 for providing a high-resolution remote sensing image, according to embodiments of the disclosure. Method 900 may be implemented by system 101, specifically inquiry module 107, and may include steps 902-908 as described below. Some of the steps may be optional to perform the disclosure provided herein. Further, some of the steps may be performed simultaneously, or in a different order than that shown in FIG. 9.

At step 902, inquiry module 107 receives one or more parameters associated with a scene. For example, the one or more parameters may include one or more of a geographical location, a date of the year, a month of the year, etc.

At step 904, inquiry module 107 determines an input set of multi-temporal images based on the one or more parameters. For example, inquiry module 107 may perform operations 802 and 804 described above with reference to FIG. 8 to determine the input set of multi-temporal images.

At step 906, inquiry module 107 applies the input set of multi-temporal images to the deep learning model to generate a high-resolution remote sensing image. For example, inquiry module 107 may perform one or more of operations 806, 808, 810 and 812 described above with reference to FIG. 8 to generate the high-resolution remote sensing image.

At step 908, inquiry module 107 provides the high-resolution remote sensing image. For example, inquiry module 107 may provide the high-resolution remote sensing image to user device 112, so that user device 112 can present the high-resolution remote sensing image to a user.

Figure 10:
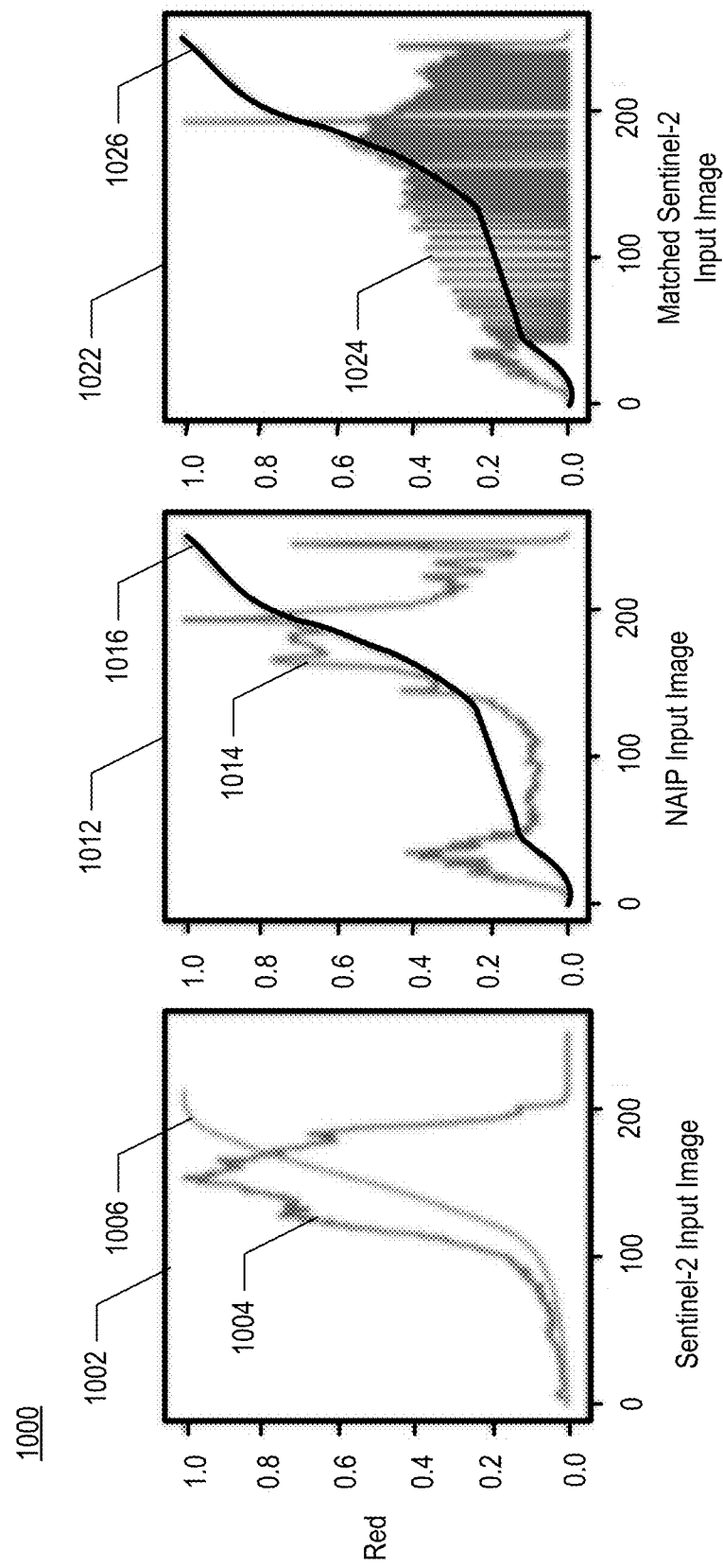
FIG. 10 is a graphical representation illustrating a histogram matching performed for an exemplary set of multi-temporal images, according to embodiments of the disclosure.

FIG. 10 is a graphical representation 1000 illustrating a histogram matching performed for an exemplary set of multi-temporal images, according to embodiments of the disclosure. The histogram matching in FIG. 10 is illustrated with respect to a channel of red color. A graph 1002 shows a histogram 1004 and a cumulative histogram 1006 of a Sentinel-2 input image. A graph 1012 shows a histogram 1014 and a cumulative histogram 1016 of an NAIP input image. After performing the histogram matching, a graph 1022 shows a histogram 1024 and a cumulative histogram 1026 of the matched Sentinel-2 input image. The cumulative histogram 1026 of the matched Sentinel-2 input image is matched to the cumulative histogram 1016 of the NAIP input image.

Figure 11:
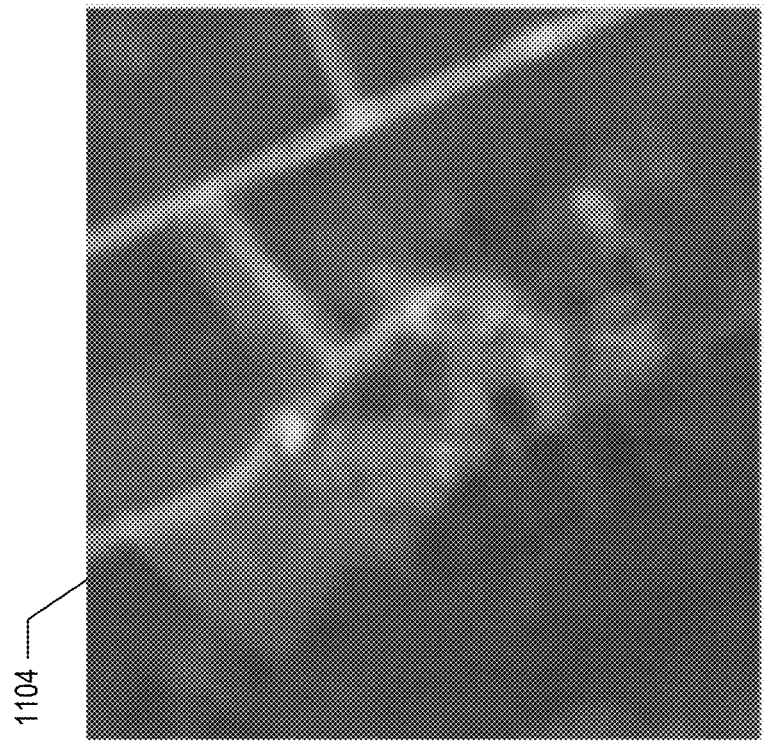
FIG. 11 is a graphical representation illustrating an exemplary performance of a multi-temporal neural network model, according to embodiments of the disclosure.
Figure 11:
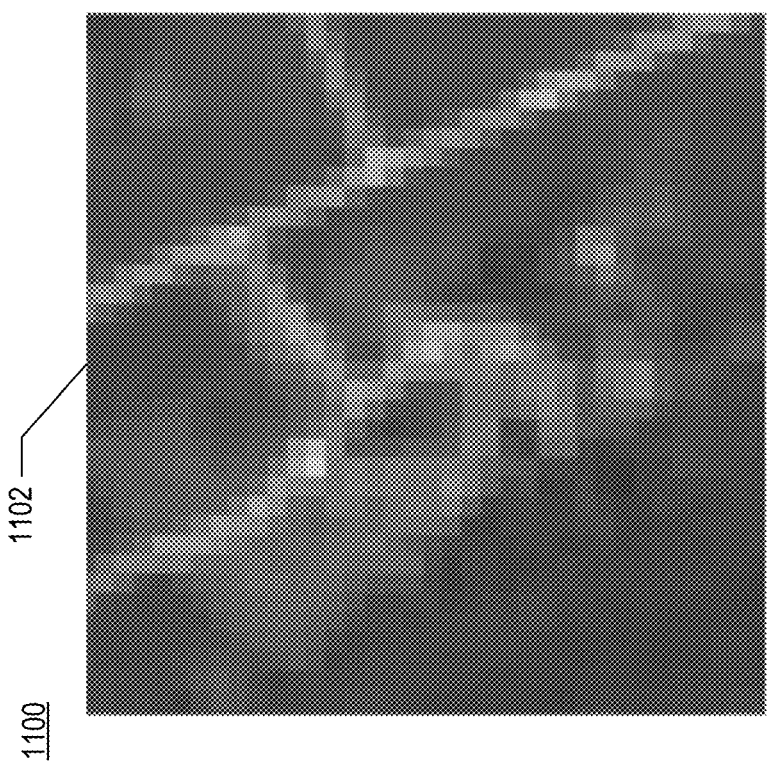

FIG. 11 is a graphical representation 1100 illustrating an exemplary performance of a multi-temporal neural network model, according to embodiments of the disclosure. An image 1102 is included in a set of multi-temporal images with a resolution of 10 meters. The set of multi-temporal images is inputted to the multi-temporal neural network model to produce an image 1104 with a resolution of 2.5 meters. Image 1104 has a higher resolution than image 1102.

Figure 12:
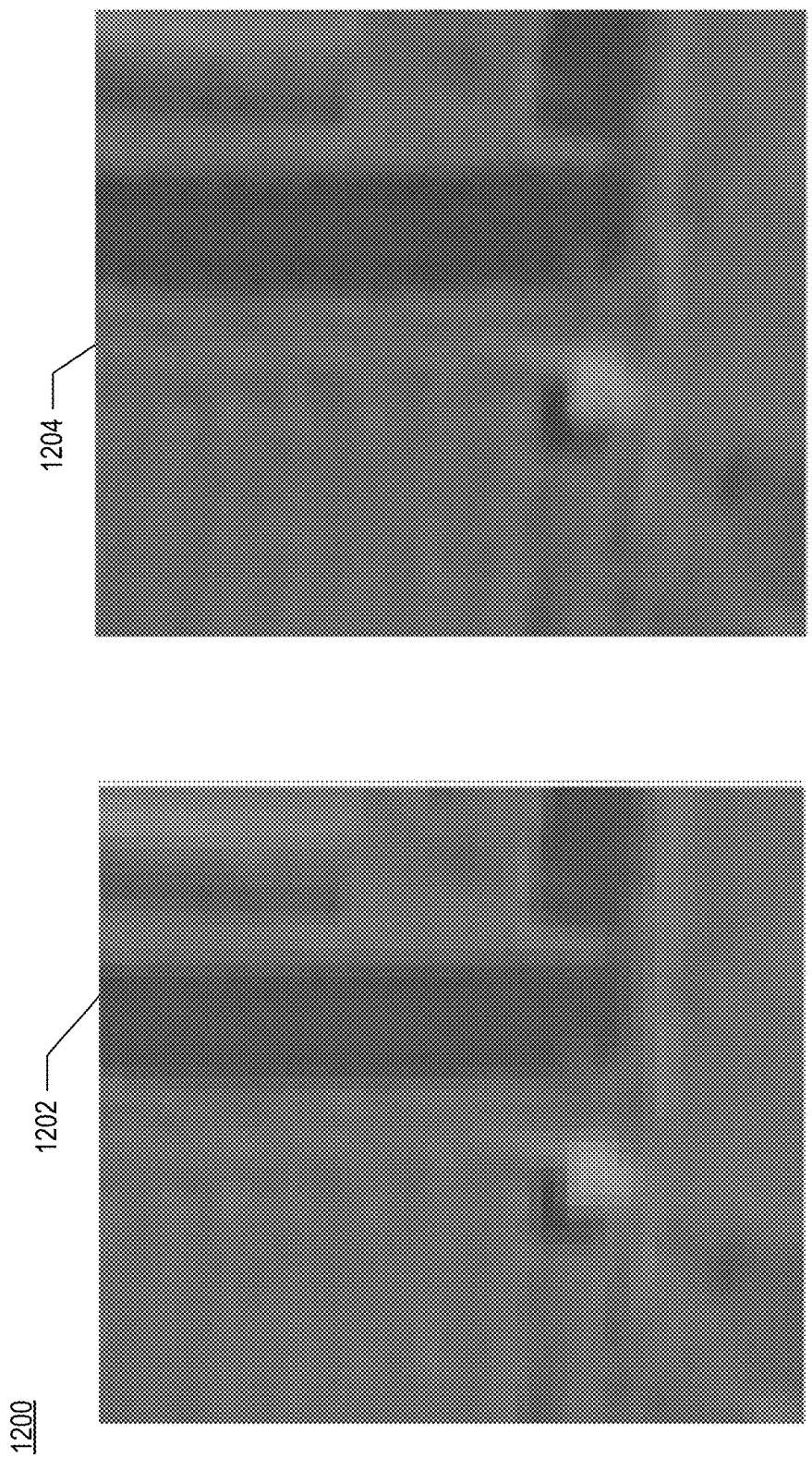
FIG. 12 is a graphical representation illustrating an exemplary performance of a single-image neural network model, according to embodiments of the disclosure.

FIG. 12 is a graphical representation 1200 illustrating an exemplary performance of a single-image neural network model, according to embodiments of the disclosure. An image 1202 has a resolution of 2.5 meters and is inputted to the single-image neural network model. An image 1204 is an output image with a resolution of 0.625 meters from the single-image neural network model. Image 1204 has a higher resolution than image 1202.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

According to one aspect of the present disclosure, a method for super-resolution image processing in remote sensing is disclosed. One or more sets of multi-temporal images with an input resolution and one or more first target images with a first output resolution are generated from one or more data sources. The first output resolution is higher than the input resolution. Each set of multi-temporal images is processed to improve an image match in the corresponding set of multi-temporal images. The one or more sets of multi-temporal images are associated with the one or more first target images to generate a training dataset. A deep learning model is trained using the training dataset. The deep learning model is provided for subsequent super-resolution image processing.

In some embodiments, each set of multi-temporal images includes a first remote sensing image with the input resolution captured at a first time from a first data source. Each set of multi-temporal images further includes one or more second remote sensing images with the input resolution captured at one or more second times from a second data source.

In some embodiments, processing each set of multi-temporal images to improve the image match in the corresponding set of multi-temporal images includes performing a histogram matching between the first remote sensing image and the one or more second remote sensing images, so that a color differentiation between the first remote sensing image and each second remote sensing image is modified to be within a predetermined range.

In some embodiments, generating, from the one or more data sources, the one or more sets of multi-temporal images and the one or more first target images includes: for each set of multi-temporal images and a first target image associated with the corresponding set of multi-temporal images, generating the first target image from the first data source; and generating the corresponding set of multi-temporal images from the first data source and the second data source. The first data source includes remote sensing images with a first source resolution. The second data source includes remote sensing images with a second source resolution.

In some embodiments, generating the first target image from the first data source includes: obtaining a source image with the first source resolution from the first data source; and downsampling the source image to generate the first target image with the first output resolution. The first source resolution is higher than the first output resolution.

In some embodiments, generating the corresponding set of multi-temporal images from the first data source and the second data source includes: determining a location of the first target image; downsampling the first target image to generate the first remote sensing image with the input resolution; obtaining the one or more second remote sensing images with the input resolution from the second data source based on the location of the first target image; and aggregating the first remote sensing image and the one or more second remote sensing images to generate the corresponding set of multi-temporal images.

In some embodiments, the deep learning model includes a multi-temporal neural network model configured to process each set of multi-temporal images to generate a corresponding first output image with the first output resolution.

In some embodiments, training the deep learning model using the training dataset includes: feeding each set of multi-temporal images to the multi-temporal neural network model to generate the corresponding first output image with the first output resolution, so that one or more first output images with the first output resolution are generated for the one or more sets of multi-temporal images; evaluating the multi-temporal neural network model based on a comparison between the one or more first output images and the one or more first target images to produce a first evaluation result; and updating the multi-temporal neural network model based on the first evaluation result.

In some embodiments, feeding each set of multi-temporal images to the multi-temporal neural network model to generate the corresponding first output image includes: aligning the corresponding set of multi-temporal images at a feature level to generate a set of aligned feature maps; fusing the set of aligned feature maps with temporal attention and spatial attention to generate a group of temporal-spatial-attention modulated features for the corresponding set of multi-temporal images; reconstructing an image residual from the group of temporal-spatial-attention modulated features; and generating the corresponding first output image based on the image residual and a reference image in the corresponding set of multi-temporal images.

In some embodiments, the deep learning model further includes a single-image neural network model cascaded to the multi-temporal neural network model. The single-image neural network model is configured to process an input image with the first output resolution to generate a second output image with a second output resolution. The second output resolution is higher than the first output resolution.

In some embodiments, the training dataset further includes one or more second target images with the second output resolution. Training the deep learning model using the training dataset further includes: feeding each first target image to the single-image neural network model to generate a corresponding second output image with the second output resolution, so that one or more second output images with the second output resolution are generated for the one or more first target images; evaluating the single-image neural network model based on a comparison between the one or more second output images and the one or more second target images to produce a second evaluation result; and updating the single-image neural network model based on the second evaluation result.

In some embodiments, one or more parameters associated with a scene are received. An input set of multi-temporal images is determined based on the one or more parameters. The input set of multi-temporal images includes a set of remote sensing images with the input resolution captured at a set of times for the scene. The input set of multi-temporal images is applied to the deep learning model to generate a high-resolution remote sensing image. The high-resolution remote sensing image has a resolution higher than the input resolution.

In some embodiments, the deep learning model includes a multi-temporal neural network model. Applying the input set of multi-temporal images to the deep learning model to generate the high-resolution remote sensing image includes feeding the input set of multi-temporal images to the multi-temporal neural network model to generate the high-resolution remote sensing image with the first output resolution.

In some embodiments, the deep learning model includes a multi-temporal neural network model and a single-image neural network model. Applying the input set of multi-temporal images to the deep learning model to generate the high-resolution remote sensing image includes: feeding the input set of multi-temporal images to the multi-temporal neural network model to generate an intermediate output image with the first output resolution; and feeding the intermediate output image to the single-image neural network model to generate the high-resolution remote sensing image with a second output resolution.

According to another aspect of the present disclosure, a system for super-resolution image processing in remote sensing is disclosed. The system includes a memory and a processor. The memory is configured to store instructions. The processor is coupled to the memory and configured to execute the instructions to perform a process including: generating, from one or more data sources, one or more sets of multi-temporal images with an input resolution and one or more first target images with a first output resolution; processing each set of multi-temporal images to improve an image match in the corresponding set of multi-temporal images; associating the one or more sets of multi-temporal images with the one or more first target images to generate a training dataset; training a deep learning model using the training dataset; and providing the deep learning model for subsequent super-resolution image processing. The first output resolution is higher than the input resolution.

In some embodiments, each set of multi-temporal images includes: a first remote sensing image with the input resolution captured at a first time from a first data source; and one or more second remote sensing images with the input resolution captured at one or more second times from a second data source.

In some embodiments, to process each set of multi-temporal images to improve an image match in the corresponding set of multi-temporal images, the processor is configured to execute the instructions to perform the process further including: performing a histogram matching between the first remote sensing image and the one or more second remote sensing images, so that a color differentiation between the first remote sensing image and each second remote sensing image is modified to be within a predetermined range.

In some embodiments, to generate, from the one or more data sources, the one or more sets of multi-temporal images and the one or more first target images, the processor is configured to execute the instructions to perform the process further including: for each set of multi-temporal images and a first target image associated with the corresponding set of multi-temporal images, generating the first target image from the first data source; and generating the corresponding set of multi-temporal images from the first data source and the second data source. The first data source includes remote sensing images with a first source resolution. The second data source includes remote sensing images with a second source resolution.

In some embodiments, to generate the first target image from the first data source, the processor is configured to execute the instructions to perform the process further including: obtaining a source image with the first source resolution from the first data source; and downsampling the source image to generate the first target image with the first output resolution. The first source resolution is higher than the first output resolution.

In some embodiments, to generate the corresponding set of multi-temporal images from the first data source and the second data source, the processor is configured to execute the instructions to perform the process further including: determining a location of the first target image; downsampling the first target image to generate the first remote sensing image with the input resolution; obtaining the one or more second remote sensing images with the input resolution from the second data source based on the location of the first target image; and aggregating the first remote sensing image and the one or more second remote sensing images to generate the corresponding set of multi-temporal images.

In some embodiments, the deep learning model includes a multi-temporal neural network model configured to process each set of multi-temporal images to generate a corresponding first output image with the first output resolution.

In some embodiments, to train the deep learning model using the training dataset, the processor is configured to execute the instructions to perform the process further including: feeding each set of multi-temporal images to the multi-temporal neural network model to generate the corresponding first output image with the first output resolution, so that one or more first output images with the first output resolution are generated for the one or more sets of multi-temporal images; evaluating the multi-temporal neural network model based on a comparison between the one or more first output images and the one or more first target images to produce a first evaluation result; and updating the multi-temporal neural network model based on the first evaluation result.

In some embodiments, to feed each set of multi-temporal images to the first neural network model to generate the corresponding first output image, the processor is configured to execute the instructions to perform the process further including: aligning the corresponding set of multi-temporal images at a feature level to generate a set of aligned feature maps; fusing the set of aligned feature maps with temporal attention and spatial attention to generate a group of temporal-spatial-attention modulated features for the set of multi-temporal images; reconstructing an image residual from the group of temporal-spatial-attention modulated features; and generating the corresponding first output image based on the image residual and a reference image in the corresponding set of multi-temporal images.

In some embodiments, the deep learning model further includes a single-image neural network model cascaded to the multi-temporal neural network model. The single-image neural network model is configured to process an input image with the first output resolution to generate a second output image with a second output resolution. The second output resolution is higher than the first output resolution.

In some embodiments, the training dataset further includes one or more second target images with the second output resolution. To train the deep learning model using the training dataset, the processor is configured to execute the instructions to perform the process further including: feeding each first target image to the single-image neural network model to generate a corresponding second output image with the second output resolution, so that one or more second output images with the second output resolution are generated for the one or more first target images; evaluating the single-image neural network model based on a comparison between the one or more second output images and the one or more second target images to produce a second evaluation result; and updating the second neural network model based on the second evaluation result.

In some embodiments, the processor is configured to execute the instructions to perform the process further including: receiving one or more parameters associated with a scene; determining an input set of multi-temporal images based on the one or more parameters, where the input set of multi-temporal images includes a set of remote sensing images with the input resolution captured at a set of times for the scene; and applying the input set of multi-temporal images to the deep learning model to generate a high-resolution remote sensing image. The high-resolution remote sensing image has a resolution higher than the input resolution.

In some embodiments, the deep learning model includes a multi-temporal neural network model. To apply the input set of multi-temporal images to the deep learning model to generate the high-resolution remote sensing image, the processor is configured to execute the instructions to perform the process further including: feeding the input set of multi-temporal images to the multi-temporal neural network model to generate the high-resolution remote sensing image with the first output resolution.

In some embodiments, the deep learning model includes a multi-temporal neural network model and a single-image neural network model. To apply the input set of multi-temporal images to the deep learning model to generate the high-resolution remote sensing image, the processor is configured to execute the instructions to perform the process further including: feeding the input set of multi-temporal images to the multi-temporal neural network model to generate an intermediate output image with the first output resolution; and feeding the intermediate output image to the single-image neural network model to generate the high-resolution remote sensing image with a second output resolution.

According to yet another aspect of the present disclosure, a non-transitory computer-readable storage medium is disclosed. The non-transitory computer-readable storage medium is configured to store instructions which, in response to an execution by a processor, cause the processor to perform a process including: generating, from one or more data sources, one or more sets of multi-temporal images with an input resolution and one or more first target images with a first output resolution; processing each set of multi-temporal images to improve an image match in the corresponding set of multi-temporal images; associating the one or more sets of multi-temporal images with the one or more first target images to generate a training dataset; training a deep learning model using the training dataset; and providing the deep learning model for subsequent super-resolution image processing. The first output resolution is higher than the input resolution.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described exemplary implementations, but should be defined only in accordance with the following claims and their equivalents.

What is claimed is:

1. A method for super-resolution image processing in remote sensing, comprising:
   generating, from one or more data sources, one or more sets of multi-temporal images with an input resolution and one or more first target images with a first output resolution, comprising:
      for each set of multi-temporal images and a first target image associated with the corresponding set of multi-temporal images,
         generating the first target image from a first data source, wherein the first data source comprises remote sensing images with a first source resolution; and
         generating the corresponding set of multi-temporal images from the first data source and a second data source, wherein the second data source comprises remote sensing images with a second source resolution,
      wherein the first output resolution is higher than the input resolution;
   processing each set of multi-temporal images to improve an image match in the corresponding set of multi-temporal images;
   associating the one or more sets of multi-temporal images with the one or more first target images to generate a training dataset;
   training a deep learning model using the training dataset; and providing the deep learning model for subsequent super-resolution image processing.

2. The method of claim 1, wherein each set of multi-temporal images comprises:
a first remote sensing image with the input resolution captured at a first time from the first data source; and
one or more second remote sensing images with the input resolution captured at one or more second times from the second data source.

3. The method of claim 2, wherein processing each set of multi-temporal images to improve the image match in the corresponding set of multi-temporal images comprises:
performing a histogram matching between the first remote sensing image and the one or more second remote sensing images, so that a color differentiation between the first remote sensing image and each second remote sensing image is modified to be within a predetermined range.

4. The method of claim 1, wherein generating the first target image from the first data source comprises:
obtaining a source image with the first source resolution from the first data source, wherein the first source resolution is higher than the first output resolution; and
downsampling the source image to generate the first target image with the first output resolution.

5. The method of claim 1, wherein generating the corresponding set of multi-temporal images from the first data source and the second data source comprises:
determining a location of the first target image;
downsampling the first target image to generate the first remote sensing image with the input resolution;
obtaining the one or more second remote sensing images with the input resolution from the second data source based on the location of the first target image; and
aggregating the first remote sensing image and the one or more second remote sensing images to generate the corresponding set of multi-temporal images.

6. The method of claim 1, wherein the deep learning model comprises a multi-temporal neural network model configured to process each set of multi-temporal images to generate the corresponding first output image with the first output resolution.

7. The method of claim 6, wherein training the deep learning model using the training dataset comprises:
feeding each set of multi-temporal images to the multi-temporal neural network model to generate the corresponding first output image with the first output resolution, so that one or more first output images with the first output resolution are generated for the one or more sets of multi-temporal images;
evaluating the multi-temporal neural network model based on a comparison between the one or more first output images and the one or more first target images to produce a first evaluation result; and
updating the multi-temporal neural network model based on the first evaluation result.

8. The method of claim 7, wherein feeding each set of multi-temporal images to the multi-temporal neural network model to generate the corresponding first output image comprises:
aligning the corresponding set of multi-temporal images at a feature level to generate a set of aligned feature maps;
fusing the set of aligned feature maps with temporal attention and spatial attention to generate a group of temporal-spatial-attention modulated features for the corresponding set of multi-temporal images;
reconstructing an image residual from the group of temporal-spatial-attention modulated features; and
generating the corresponding first output image based on the image residual and a reference image in the corresponding set of multi-temporal images.

9. The method of claim 6, wherein the deep learning model further comprises a single-image neural network model cascaded to the multi-temporal neural network model,
wherein the single-image neural network model is configured to process an input image with the first output resolution to generate a second output image with a second output resolution, and
wherein the second output resolution is higher than the first output resolution.

10. The method of claim 9, wherein the training dataset further comprises one or more second target images with the second output resolution, and
wherein training the deep learning model using the training dataset further comprises:
feeding each first target image to the single-image neural network model to generate a corresponding second output image with the second output resolution, so that one or more second output images with the second output resolution are generated for the one or more first target images;
evaluating the single-image neural network model based on a comparison between the one or more second output images and the one or more second target images to produce a second evaluation result; and
updating the single-image neural network model based on the second evaluation result.

11. The method of claim 1, further comprising:
receiving one or more parameters associated with a scene;
determining an input set of multi-temporal images based on the one or more parameters, wherein the input set of multi-temporal images comprises a set of remote sensing images with the input resolution captured at a set of times for the scene; and
applying the input set of multi-temporal images to the deep learning model to generate a high-resolution remote sensing image, wherein the high-resolution remote sensing image has a resolution higher than the input resolution.

12. The method of claim 11, wherein the deep learning model comprises a multi-temporal neural network model, and
wherein applying the input set of multi-temporal images to the deep learning model to generate the high-resolution remote sensing image comprises:
feeding the input set of multi-temporal images to the multi-temporal neural network model to generate the high-resolution remote sensing image with the first output resolution.

13. The method of claim 11, wherein the deep learning model comprises a multi-temporal neural network model and a single-image neural network model, and
wherein applying the input set of multi-temporal images to the deep learning model to generate the high-resolution remote sensing image comprises:
feeding the input set of multi-temporal images to the multi-temporal neural network model to generate an intermediate output image with the first output resolution; and feeding the intermediate output image to the single-image neural network model to generate the high-resolution remote sensing image with a second output resolution.

14. A system for super-resolution image processing in remote sensing, comprising:
a memory configured to store instructions; and
a processor coupled to the memory and configured to execute the instructions to perform a process comprising:
generating, from one or more data sources, one or more sets of multi-temporal images with an input resolution and one or more first target images with a first output resolution, comprising:
for each set of multi-temporal images and a first target image associated with the corresponding set of multi-temporal images,
generating the first target image from a first data source, wherein the first data source comprises remote sensing images with a first source resolution; and
generating the corresponding set of multi-temporal images from the first data source and a second data source, wherein the second data source comprises remote sensing images with a second source resolution,
wherein the first output resolution is higher than the input resolution;
processing each set of multi-temporal images to improve an image match in the corresponding set of multi-temporal images;
associating the one or more sets of multi-temporal images with the one or more first target images to generate a training dataset;
training a deep learning model using the training dataset; and
providing the deep learning model for subsequent super-resolution image processing.

15. The system of claim 14, wherein each set of multi-temporal images comprises:
a first remote sensing image with the input resolution captured at a first time from the first data source; and
one or more second remote sensing images with the input resolution captured at one or more second times from the second data source.

16. The system of claim 15, wherein to process each set of multi-temporal images to improve an image match in the corresponding set of multi-temporal images, the processor is configured to execute the instructions to perform the process further comprising:
performing a histogram matching between the first remote sensing image and the one or more second remote sensing images, so that a color differentiation between the first remote sensing image and each second remote sensing image is modified to be within a predetermined range.

17. The system of claim 14, wherein to generate the first target image from the first data source, the processor is configured to execute the instructions to perform the process further comprising:

obtaining a source image with the first source resolution from the first data source, wherein the first source resolution is higher than the first output resolution; and
downsampling the source image to generate the first target image with the first output resolution.

18. A non-transitory computer-readable storage medium configured to store instructions which, in response to an execution by a processor, cause the processor to perform a process comprising:
generating, from one or more data sources, one or more sets of multi-temporal images with an input resolution and one or more first target images with a first output resolution, comprising:
for each set of multi-temporal images and a first target image associated with the corresponding set of multi-temporal images,
generating the first target image from a first data source, wherein the first data source comprises remote sensing images with a first source resolution; and
generating the corresponding set of multi-temporal images from the first data source and a second data source, wherein the second data source comprises remote sensing images with a second source resolution,
wherein the first output resolution is higher than the input resolution;
processing each set of multi-temporal images to improve an image match in the corresponding set of multi-temporal images;
associating the one or more sets of multi-temporal images with the one or more first target images to generate a training dataset;
training a deep learning model using the training dataset; and
providing the deep learning model for subsequent super-resolution image processing.

19. The non-transitory computer-readable storage medium of claim 18, wherein each set of multi-temporal images comprises:
a first remote sensing image with the input resolution captured at a first time from the first data source; and
one or more second remote sensing images with the input resolution captured at one or more second times from the second data source.

20. The non-transitory computer-readable storage medium of claim 19, wherein processing each set of multi-temporal images to improve the image match in the corresponding set of multi-temporal images comprises:
performing a histogram matching between the first remote sensing image and the one or more second remote sensing images, so that a color differentiation between the first remote sensing image and each second remote sensing image is modified to be within a predetermined range.

* * * * *